(12) United States Patent
Onoda

(10) Patent No.: US 12,260,627 B2
(45) Date of Patent: Mar. 25, 2025

(54) UNMANNED FORKLIFT

(71) Applicant: NAKANISHI METAL WORKS CO., LTD., Osaka (JP)

(72) Inventor: Keisuke Onoda, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 222 days.

(21) Appl. No.: 17/663,295

(22) Filed: May 13, 2022

(65) Prior Publication Data

US 2022/0375206 A1 Nov. 24, 2022

(30) Foreign Application Priority Data

May 19, 2021 (JP) .................................. 2021-084906
Mar. 17, 2022 (JP) .................................. 2022-042127

(51) Int. Cl.
*G06V 10/80* (2022.01)
*B66F 9/06* (2006.01)
*G05D 1/00* (2006.01)
*G06V 20/60* (2022.01)

(52) U.S. Cl.
CPC ............ *G06V 10/803* (2022.01); *B66F 9/063* (2013.01); *G05D 1/021* (2013.01); *G06V 20/60* (2022.01)

(58) Field of Classification Search
CPC ...... G06V 10/803; G06V 20/60; G06V 20/64; G06V 2201/06; B66F 9/063; B66F 9/0755; B66F 9/142; G05D 1/021; G05D 1/0248

See application file for complete search history.

(56) References Cited

U.S. PATENT DOCUMENTS

2018/0155169 A1* 6/2018 Tanaka ..................... G05D 1/02
2020/0369499 A1* 11/2020 Kim ....................... B66F 9/0755

FOREIGN PATENT DOCUMENTS

| JP | H09218014 A | 8/1997 | |
| JP | 2017019596 A | 1/2017 | |
| KR | 102318692 B1 * | 3/2020 | ............. G06F 21/10 |

OTHER PUBLICATIONS

KR102318692B1—EPO machine translation (Year: 2020).*

* cited by examiner

*Primary Examiner* — Yuen Wong
(74) *Attorney, Agent, or Firm* — INNOVATION CAPITAL LAW GROUP, LLP; Vic Lin

(57) ABSTRACT

An image obtaining section obtains a taken image from an imaging device. A pallet type identification section has a learning model for combinations of images of a plurality of types of pallets and types of the pallets, and identifies a type of a target pallet by inputting, to the learning model, the taken image of the target pallet, which is obtained by the image obtaining section. A pallet position/shape obtaining section obtains position/shape data of the target pallet from a distance measuring device for measuring a distance to the target pallet. A pallet deviation detection section previously stores position/shape data of the pallets and performs comparison between the stored position/shape data corresponding to the identified type of the target pallet and the position/shape data of the target pallet.

12 Claims, 16 Drawing Sheets

UNMANNED FORKLIFT

BACKGROUND OF THE INVENTION

Field of the Invention

The present invention relates to an unmanned forklift that is self-propelled in an unattended state and performs load handling.

Description of the Background Art

For unmanned forklifts (it is also referred to as "unmanned autonomous forklifts"), a technique of determining whether or not forks can be inserted into insertion openings (holes 20 in Patent Literature 1) of a pallet has been known (for example, see the first embodiment in Patent Literature 1). In this technique, an unmanned forklift 11 includes a laser range finder 18 that can be moved upward and downward together with forks 14. The laser range finder 18 performs scanning while applying laser beams to an opening end face 19a of a pallet 19 disposed at a load pickup position, to obtain image data of a line of an edge of the hole 20. A pattern controller 21 performs comparison between the obtained image data of the line of the hole 20 and image data of images, of the line of the hole 20, which were previously taken under a plurality of conditions obtained by changing a distance and a tilt of the end face of the pallet 19 relative to the unmanned forklift 11, thereby determining whether or not the forks 14 can be inserted into the holes 20 of the pallet 19.

Furthermore, for unmanned forklifts, a technique of identifying a type of a pallet and adjusting an interval between the forks according to an interval between the insertion openings (holes 20 in Patent Literature 1) of the identified pallet has been known (for example, see the second embodiment in Patent Literature 1). In this technique, as the pallet 19, a plurality of types of pallets having different intervals between the holes 20 are used, and the unmanned forklift 11 includes a fork shifter capable of adjusting an interval between a pair of the forks 14. The pattern controller 21 specifies a width of the pallet 19 based on the image data, of the line of the edge of the hole 20, obtained by the laser range finder 18, thereby identifying the type of the pallet 19. A controller 17 controls the fork shifter according to the interval between the holes 20 corresponding to the specified width of the pallet 19 to adjust the interval between the pair of the forks 14.

Moreover, for unmanned forklifts, a technique of identifying a type of a pallet has been known (for example, see Patent Literature 2). In this technique, a pallet 05 is provided with a pattern 01, and an unmanned forklift 5 includes a pair of cameras 3 and 4. The cameras 3 and 4 take an image of the pattern 01 of the pallet 05. The position determination means determines a position of the pallet 05 from the taken image of the pattern, and the comparison means compares the taken image of the pattern and a reference pattern with each other to identify a type of the pallet 05.

CITATION LIST

Patent Literature

PTL 1: Japanese Unexamined Patent Application Publication No. 2017-19596
PTL 2: Japanese Unexamined Patent Application Publication No. H9-218014

SUMMARY OF THE INVENTION

The unmanned forklift disclosed in Patent Literature 1 identifies a type of a pallet by detecting an image of a line of an edge of the hole in the opening end face of the pallet in the measurement of a distance with use of laser. Therefore, for example, in a case where a load or another pallet is just lateral to the pallet, in a case where the hole of the pallet is closed by a part of a stretch film for fixing a load to the pallet, or in a case where a foreign substance is in the hole of the pallet, a type of the pallet may not be identified or a type of the pallet may be erroneously identified.

Identification of a type of a pallet in the unmanned forklift disclosed in Patent Literature 2 increases cost since patterns need to be attached to all the pallets for which load handling is to be performed by the unmanned forklift. In a case where identification is performed for multiple types of pallets having different shapes, the patterns need to be attached to all of the pallets at common places, so that the types of the pallets to be handled are limited.

Meanwhile, for example, in a case where a plurality of types of pallets are detected for position deviation by only a distance detector such as a laser scanner, actually measured shape data obtained by the distance detector needs to be compared with all types of stored position/shape data of a plurality of types of pallets, in order to identify a type of the corresponding pallet.

Therefore, in a case where the number of types of target pallets is increased, an object (for example, carton), other than a pallet, placed on a floor is more likely to be erroneously identified as a specific type of a pallet, due to characteristics of the distance detector for performing measurement by using distance data only.

In addition, a calculation load for comparison in shape data for a plurality of types of pallets is great, so that calculation requires much time and an operation speed is lowered, or cost is increased if an expensive calculator having a high processing capacity is used.

An object of the present invention is to provide an unmanned forklift that can inhibit reduction of an operation speed and increase of cost, detect deviation of a position and an orientation of a target pallet from a normal position of the pallet with high accuracy, and assuredly perform predetermined load handling, without limiting types of pallets that can be handled.

In order to solve the aforementioned problems, an unmanned forklift according to the present invention is directed to an unmanned forklift that has a pair of forks and automatically performs load handling with use of a pallet, and the unmanned forklift includes: an image obtaining section that obtains a taken image from an imaging device for taking an image of a portion in front of the unmanned forklift; a pallet type identification section having, for a plurality of types of pallets, a learning model obtained by machine learning for a combination of an image of each of the pallets and a corresponding one of the types of the pallets, the pallet type identification section identifying a type of a target pallet by inputting, to the learning model, the taken image of the target pallet, which is obtained by the image obtaining section; a pallet position/shape obtaining section that obtains position/shape data of the target pallet from a distance measuring device for measuring a distance to the target pallet; a pallet deviation detection section that previously stores, for the plurality of types of the pallets, position/shape data of each of the pallets, and performs comparison between the position/shape data that is stored and corresponds to the type of the target pallet, which is identified by the pallet type identification section, and position/shape data of the target pallet, which is obtained by the pallet position/shape obtaining section, to detect deviation of a position and an orientation of the target pallet from a normal position; and a traveling controller that controls traveling for performing at least one of (A) an operation including an operation of inserting the forks respectively into insertion openings of the target pallet with reference to the deviation detected, and (B) a stacking operation of stacking the pallet and a load held by the forks inserted into the insertion openings, onto a load on the target pallet according to the deviation of the target pallet.

In this configuration, even if objects to be transported by the unmanned forklift are a plurality of types of pallets having different shapes, there is no limits for types of pallets that can be handled. Even in such a case, the taken image is inputted to the learning model obtained by machine learning for a combination of an image of each pallet and a type of the pallet, whereby the pallet type identification section highly accurately identifies a type of the target pallet. Thus, the pallet deviation detection section can perform comparison between the stored position/shape data corresponding to the type of the target pallet, which is identified by the pallet type identification section, and the position/shape data of the target pallet, which is obtained by the pallet position/shape obtaining section.

Thus, deviation of a position and an orientation of the target pallet from the normal position of the pallet can be detected with high accuracy, and erroneous recognition of an object (for example, carton), other than a pallet, placed on the floor as a specific type of a pallet can be prevented, thereby preventing an interference accident of a pallet or the object with the fork. Calculation for comparison of shape data of a pallet is shortened, and an operation speed is enhanced, so that an expensive calculator having high processing capability need not be used.

In a state where the deviation of the target pallet has been detected with high accuracy, the unmanned forklift can perform, for example, an operation of picking up a pallet and a load on a floor and transporting the pallet and the load to another place, and an operation of picking up a second-tier pallet and load on a load on a first-tier pallet and transporting the picked-up pallet and load to another place, as the operation (A), or a predetermined load handling operation such as the stacking operation, as the operation (B).

In a preferable embodiment, the position/shape data is data representing a height of the target pallet, the height including the insertion openings of the pallet, and the pallet deviation detection section performs comparison between a line segment based on the position/shape data that is stored and corresponds to the type of the target pallet, and a line segment based on the position/shape data of the target pallet, which is obtained by the pallet position/shape obtaining section, under a condition that both the line segments overlap each other.

In this configuration, the line segments are compared under the condition that the line segments overlap each other, to obtain the deviation, thereby reducing calculation cost. Moreover, data of the height can be obtained merely by scanning in the horizontal direction, so that the distance measuring device for measuring a distance to the target pallet need not be moved upward and downward, whereby time for detecting the deviation of the position and the orientation of the target pallet can be shortened.

In a preferable embodiment, the unmanned forklift further includes a deviation error determination section that performs error determination, when the deviation detected by the pallet deviation detection section is greater than a predetermined threshold value.

In this configuration, in a case where the fork cannot be inserted into the target pallet due to the deviation being great, occurrence of an error is determined before the fork insertion operation, whereby an interference accident between the target pallet and the fork can be prevented. For example, the threshold value of the deviation as a criterion in the error determination is a maximum value in a range from a predetermined stop position at which the unmanned forklift is stopped, to a position at which the unmanned forklift is self-propelled from the predetermined stop position and the fork can be inserted into the target pallet, when the distance measuring device measures a distance to the target pallet and the pallet position/shape obtaining section obtains the position/shape data of the target pallet.

In a preferable embodiment, the unmanned forklift further includes a pallet shape determination section that performs comparison between shape data of the target pallet, which is obtained by the pallet position/shape obtaining section, and previously stored shape data of a same type of pallet as the target pallet, and determines that the shape data of the target pallet, which is obtained, is erroneous when a difference in the comparison is greater than a predetermined threshold value.

In this configuration, for example, in a case where another object (for example, carton) is placed just lateral to the target pallet, the size of the target pallet may be erroneously detected due to the object. Even in such a case, comparison with a stored shape of the pallet corresponding to the type of the target pallet, which is identified by the pallet type identification section, is performed, thereby determining an error. Thus, an interference accident of the fork with the insertion opening of the target pallet, resulting in stop of the operation, can be prevented.

In a preferable embodiment, the unmanned forklift further includes a pallet stacking determination section that calculates a total number of the pallets in a specific range preset to have the target pallet therein, through image processing of the taken image of the target pallet, which is obtained by the image obtaining section, to thereby determine whether stacking is completed.

In this configuration, by merely calculating the number of pallets in the specific range in front of the unmanned forklift, completion of stacking of pallets can be assuredly determined without erroneously detecting a pallet other than a target pallet. Accordingly, such an erroneous detection in which a pallet, other than the target pallet, which is placed lateral to the target pallet on the floor, is also detected, and the number of the pallets is calculated as two, for example, can be prevented. Therefore, erroneous determination that stacking is determined as being impossible even in a case where the stacking is possible can be avoided.

In a preferable embodiment, the pallet stacking determination section having previously learned, through the machine learning, the image of the pallet as teaching data, for the pallets in a plurality of upper and lower tiers.

In this configuration, for a case where an image of a portion around the pallet is different depending on a tier of the pallet, learning is performed by using the different images of the portions around the pallets as teaching data, thereby enhancing pallet detection accuracy.

In a preferable embodiment, the unmanned forklift further includes a fork width change device that changes an interval between the forks so that the interval corresponds to a width between the insertion openings of the target pallet depending on the type of the target pallet, which is obtained by the pallet type identification section.

In this configuration, the unmanned forklift need not be prepared for each of target pallets having different intervals between the insertion openings, and one unmanned forklift can transport a plurality of types of pallets by operating the fork width change device so as to obtain the interval between the forks corresponding to the interval between the insertion openings.

In a preferable embodiment, the unmanned forklift further includes: a distance sensor that is disposed at a leading end of each of the forks, and detects presence or absence of an object in front thereof; and a load detecting sensor that detects whether the pallet is held by the forks, in which a detection result from the distance sensor about the presence or absence of the object, and a detection result from the load detecting sensor about whether the pallet is held, are used to perform at least one of: a stacking operation of stacking a second-tier pallet and a load onto a load on a first-tier pallet; and an unstacking operation of picking up the second-tier pallet and the load on the load on the first-tier pallet and transporting the second-tier pallet and the load which are picked up to another place.

In this configuration, when the stacking operation is performed, the distance sensor can detect a height of a load on the first-tier pallet, and the load detecting sensor can detect a height at which the forks are to be withdrawn after the stacking operation. When the unstacking operation is performed, the distance sensor can detect a height of the insertion opening of the second-tier pallet, and the load detecting sensor can detect a state where the pallet and the load to be held in the unstacking operation are held by the forks. Therefore, the distance sensor and the load detecting sensor allow the stacking operation and/or the unstacking operation to be assuredly performed.

In a preferable embodiment, the imaging device takes the image of the target pallet; the pallet type identification section identifies the type of the target pallet at a first stop position; the distance measuring device measures a distance to the target pallet at a second stop position that is closer to the target pallet than the first stop position is; and the pallet position/shape obtaining section obtains the position/shape data of the target pallet.

In this configuration, at the second stop position that is closer to the target pallet than the first stop position is, the distance measuring device measures a distance to the target pallet, and the pallet position/shape obtaining section obtains the position/shape data of the target pallet. Therefore, the pallet deviation detection section can more accurately detect deviation of the position and the orientation of the target pallet.

As described above, the unmanned forklift of the present invention can inhibit reduction of an operation speed and increase of cost, detect deviation of a position and an orientation of a target pallet from a normal position of the pallet with high accuracy, and assuredly perform predetermined load handling, without limiting types of pallets that can be handled.

DESCRIPTION OF THE PREFERRED EMBODIMENTS

An embodiment according to the present invention will be described below with reference to the drawings.

In the embodiment described below, a direction in which a leading end of a fork of an unmanned forklift is viewed from a root side thereof is defined as the front, the opposite direction is defined as the rear, and the left and the right are defined with respect to the forward direction.

A front view of the unmanned forklift is defined as a view viewed toward the front face at which the forks are disposed. A front view of a target pallet and a load is defined as a view viewed toward a face at which fork insertion openings of the target pallet are formed.

<Unmanned Forklift>

Figure 1:
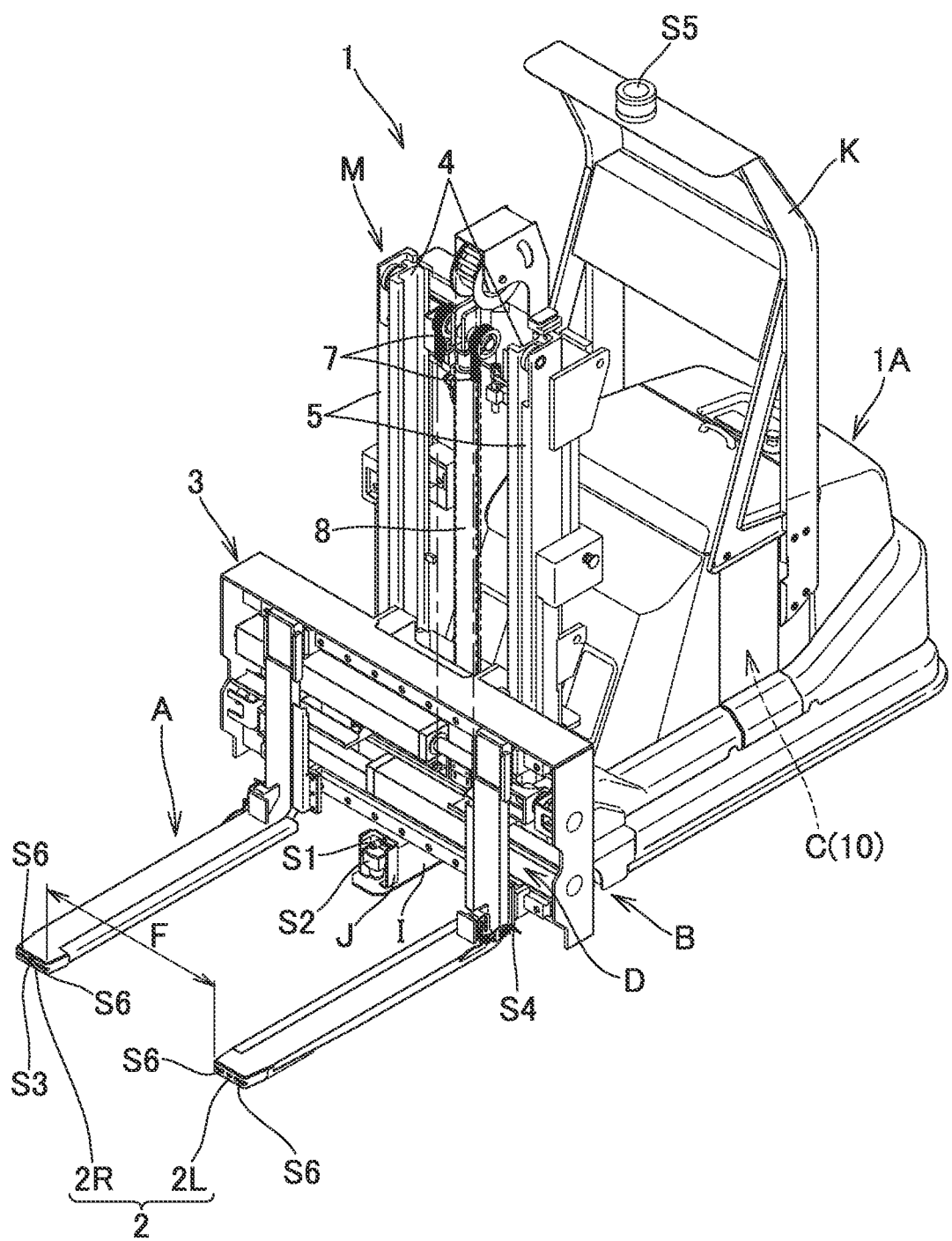
FIG. 1 is a perspective view of an unmanned forklift according to an embodiment of the present invention.
Figure 2:
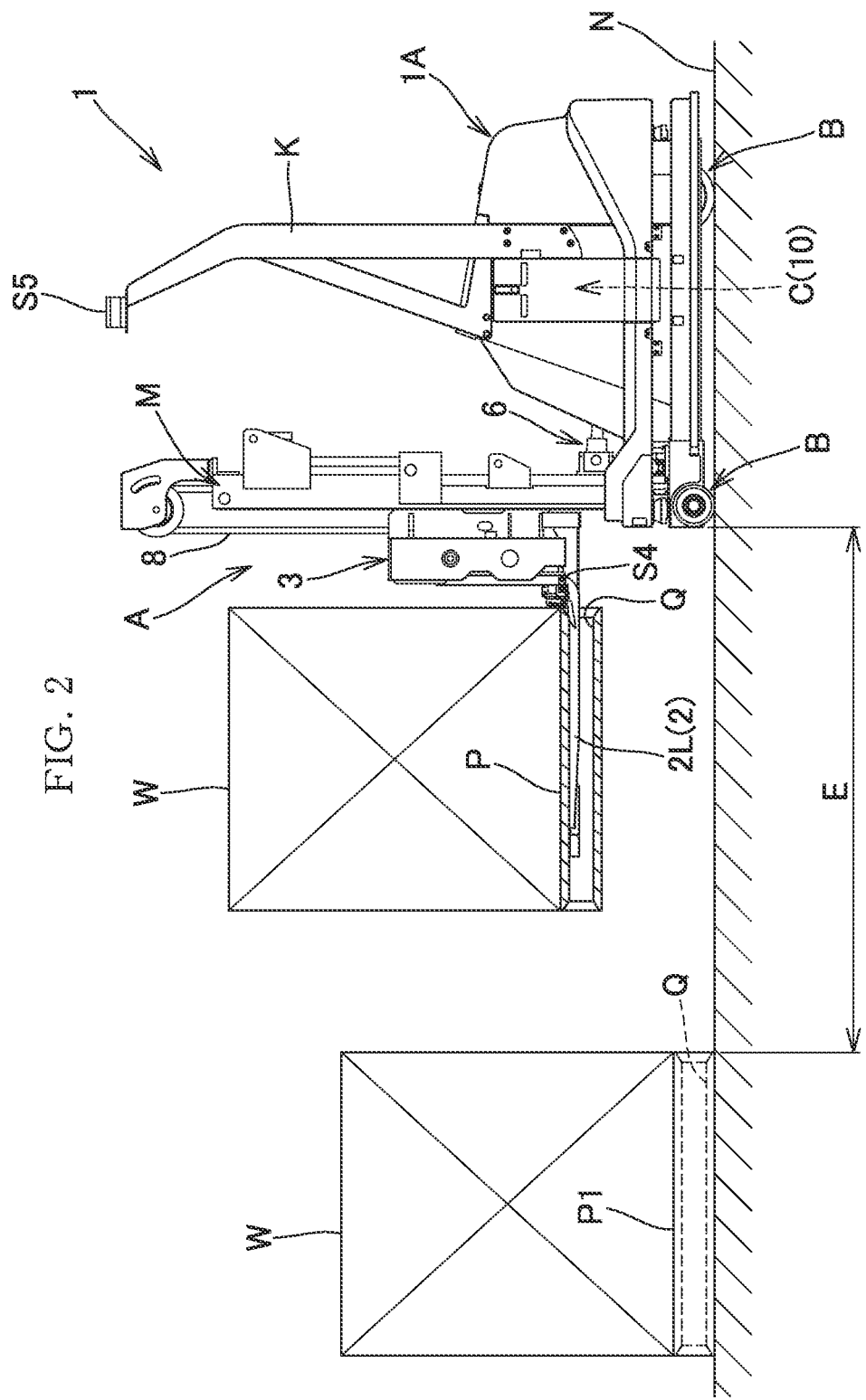
FIG. 2 illustrates the unmanned forklift holding a pallet and a load as viewed from the left side, and is a cross-sectional view of the pallet into which forks are inserted through insertion openings.
Figure 3:
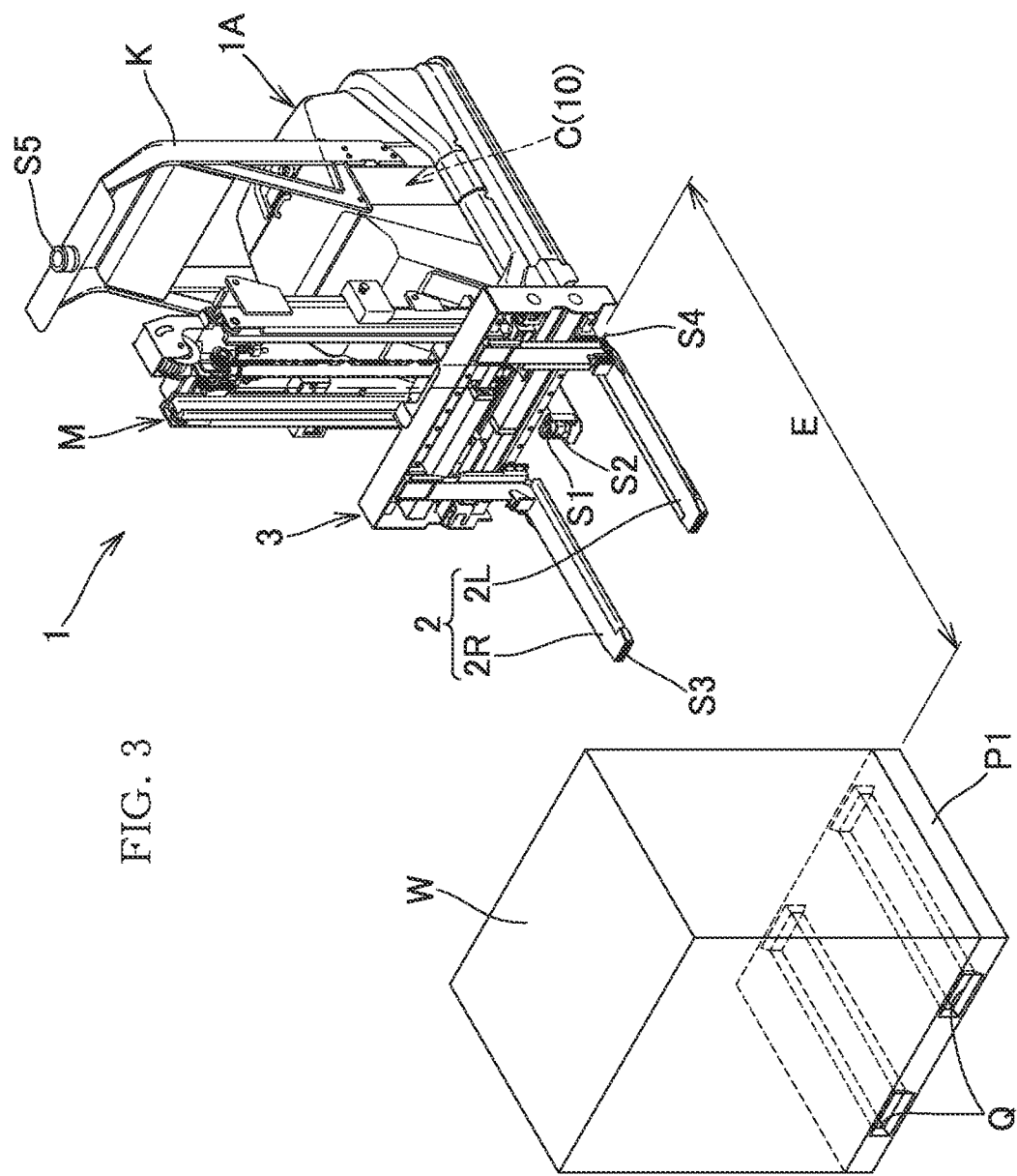
FIG. 3 is a perspective view of a pallet and a load on a floor, and the unmanned forklift.
Figure 4:
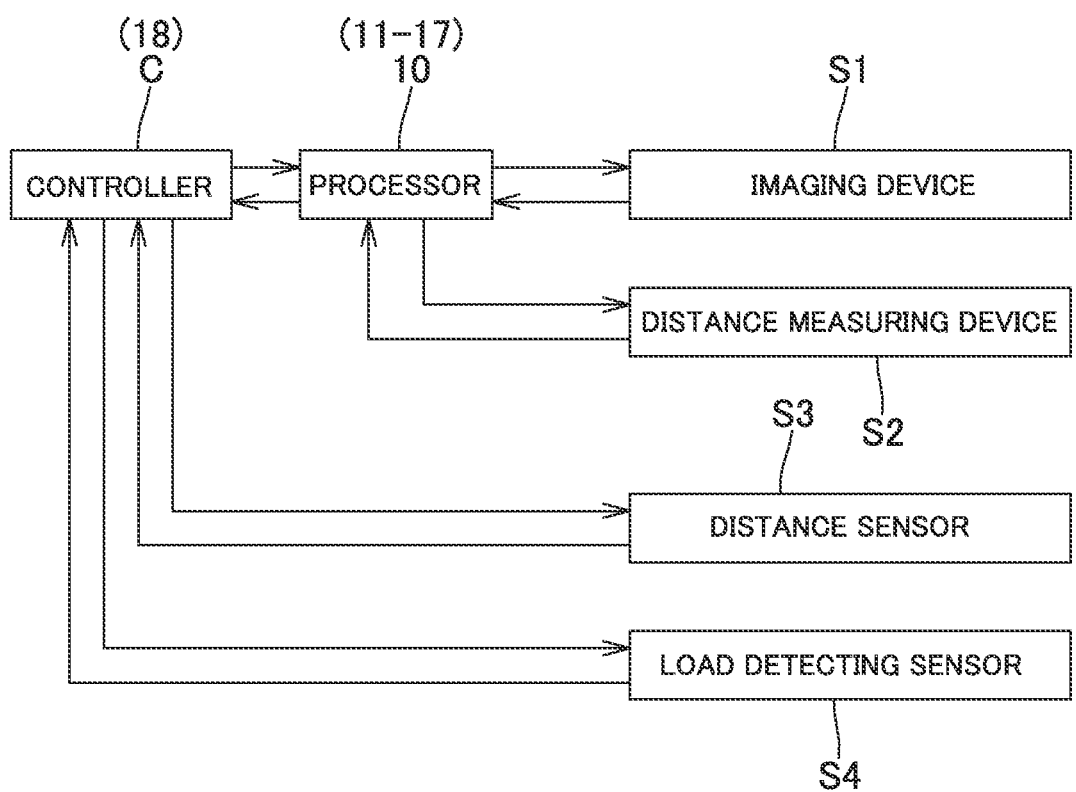
FIG. 4 is a block diagram illustrating an outline of an apparatus configuration.

An unmanned forklift 1, according to an embodiment of the present invention, illustrated in a perspective view in FIG. 1, a left side view in FIG. 2, a perspective view in FIG. 3, and a block diagram illustrating an outline of an apparatus configuration in FIG. 4 has a self-position estimating function, is self-propelled according to a destination instruction from a managing device that performs wireless communication with the unmanned forklift 1, and performs load handling. The unmanned forklift 1 includes a load handling device A for performing the load handling, a movement device B that performs traveling and turning operations, a controller C for controlling the load handling device A and the movement device B, a fork width change device D, a processor 10, and the like.

(Load Handling Device)

The load handling device A includes a mast M that is moved upward and downward and is tilted in the front-rear direction, a fork 2 on which a pallet P and a load W are placed, and a lift bracket 3 that supports the fork 2 and is moved upward and downward along the mast M. The fork 2 includes a right fork 2R and a left fork 2L.

The fork 2 and the lift bracket 3 are moved upward and downward along inner masts 4 through lift chains 7. The mast M includes the inner masts 4 that support the lift bracket 3 and are moved upward and downward, and outer masts 5 that guide the inner masts 4 such that the inner masts 4 can be moved upward and downward. The outer mast 5 is tilted through a tilt cylinder 6 in the front-rear direction.

(Movement Device)

The movement device B has a pair of left and right front wheels and a rear wheel acting as a drive wheel and steering wheel, and includes a driving device for the rear wheel.

(Controller)

The controller C controls an upward/downward movement driving device for the load handling device A, a driving device for the movement device B, and a driving device for the tilt cylinder 6, and has a communication device for communicating with the managing device on the ground side. Furthermore, the controller C has an interface with the processor 10 illustrated in FIG. 4, and interfaces with a distance sensor S3 and a load detecting sensor S4.

(Fork Width Change Device)

The fork width change device D changes an interval F between the right fork 2R and the left fork 2L.

(Processor)

The processor 10 illustrated in FIG. 4 has an interface with an imaging device S1, and provides the imaging device S1 with an instruction for taking an image. The processor 10 also has an interface with a distance measuring device S2, and provides the distance measuring device S2 with an instruction for measuring a distance.

<Pallet>

Pallets P and P1 in the left side view in FIG. 2 and the perspective view in FIG. 3 are, for example, a flat pallet, and each have insertion openings Q for the left and the right forks 2L and 2R. The load W is placed on each of the pallets P and P1.

<Sensors>

As illustrated in the perspective view in FIG. 1 and the block diagram illustrating the outline of the apparatus configuration in FIG. 4, the unmanned forklift 1 includes the imaging device S1, the distance measuring device S2, the distance sensor S3, the load detecting sensor S4, a self-position recognizing sensor S5, and an obstacle detecting sensor S6. The sensors S1 to S6 are disposed at positions described below. The controller C and the processor 10 illustrated in FIG. 4 are disposed in a main body 1A of the unmanned forklift 1 as illustrated in FIG. 1.

(Imaging Device and Distance Measuring Device)

As illustrated in FIG. 1, the imaging device S1 and the distance measuring device S2 are held by a bracket J attached to a support plate I that protrudes forward from the center, in the left-right direction, of the front lower portion of the main body 1A of the unmanned forklift 1. In other words, the imaging device S1 and the distance measuring device S2 are disposed not in a member, such as the lift bracket 3 and the fork 2, which is movable relative to the main body 1A but in a member which is not movable relative to the main body 1A. The structure for holding the imaging device S1 and the distance measuring device S2 is also applied to a structure illustrated in other drawings such as FIG. 9.

The imaging device S1 is implemented by, for example, a monocular camera, and takes an image of a portion forward of the unmanned forklift 1 at a predetermined stop position at which the unmanned forklift 1 is stopped. The distance measuring device S2 is implemented by, for example, two-dimensional light detection and ranging (2D-LiDAR)) or a time of flight (TOF) camera, and performs distance measurement for a target pallet P1 (for example, FIG. 2) on a floor N at a predetermined stop position at which the unmanned forklift 1 is stopped. In a case where the distance measuring device S2 is 2D-LiDAR, pulse-like laser light is applied while the direction is changed to the horizontal direction, and scattered light that is reflected and returned is detected, to measure, for example, a distance to and a direction of a target object based on a time until return of the light reflected by the object.

As illustrated in FIG. 4, an image taken by the imaging device S1 is transmitted to the processor 10, and data measured by the distance measuring device S2 is transmitted to the processor 10.

(Distance Sensor)

Figure 5A:
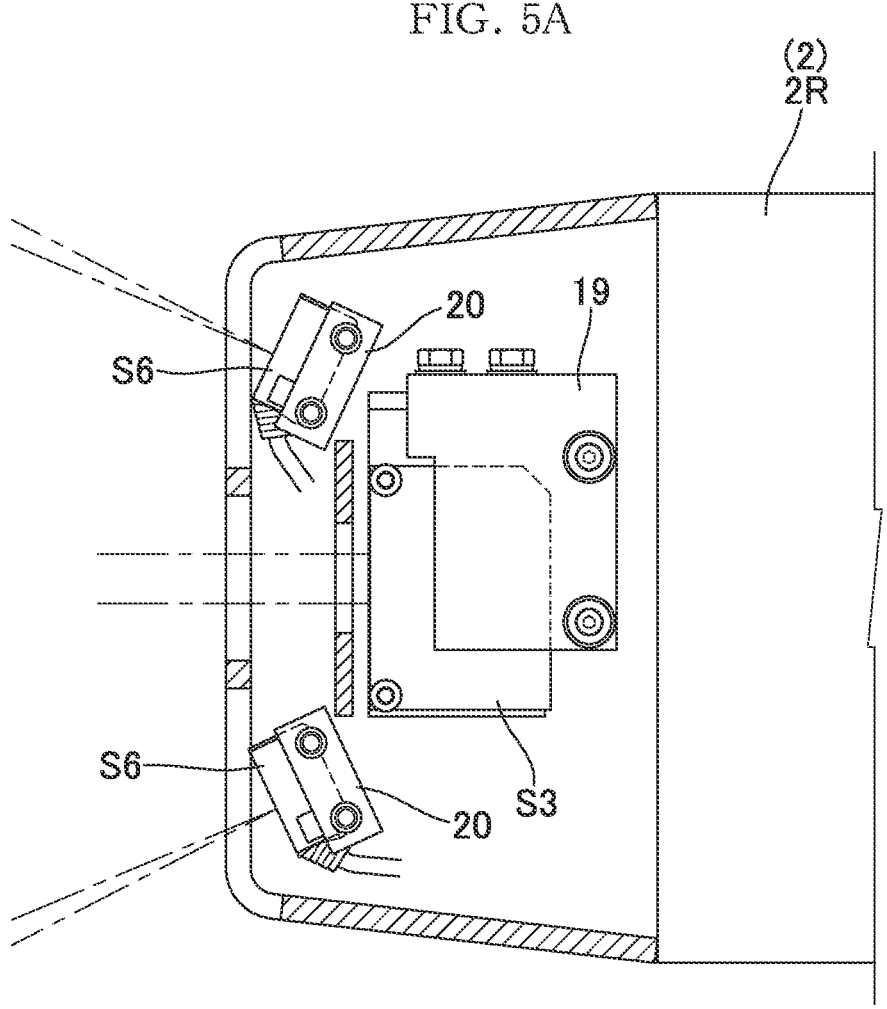
FIG. 5A is an enlarged transverse cross-sectional view of a main portion illustrating sensors disposed at a leading end portion of a right fork.
Figure 5B:
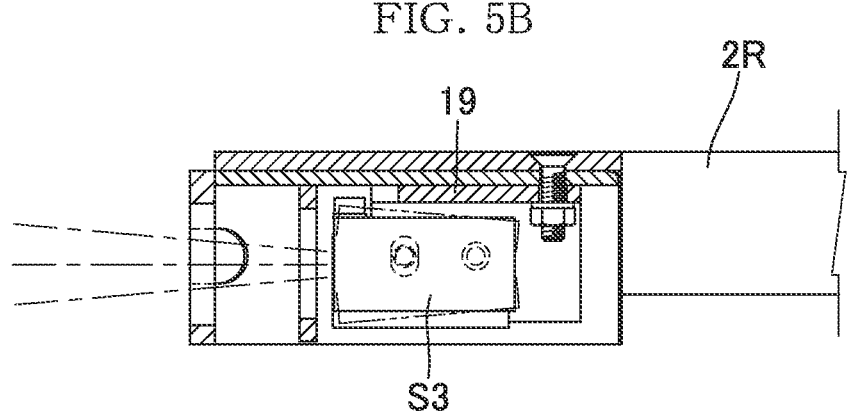
FIG. 5B is an enlarged vertical cross-sectional view of a main portion illustrating the sensor disposed at the leading end portion of the right fork.

As illustrated in the perspective view in FIG. 1, the enlarged transverse cross-sectional view of the main portion in FIG. 5A, and the enlarged vertical cross-sectional view of the main portion in FIG. 5B, the distance sensor S3 is disposed at a leading end portion of the right fork 2R in a state where the distance sensor S3 is fixed by a mounting plate 19. The distance sensor S3 may be disposed at a leading end portion of the left fork 2L. The distance sensor S3 is implemented by, for example, a distance setting type photoelectric sensor, and detects presence or absence of an object in front thereof.

As illustrated in FIG. 4, a signal (for example, ON/OFF signal) indicating the presence or absence of the object which is detected by the distance sensor S3 is transmitted to the controller C.

(Obstacle Detecting Sensor)

As illustrated in the perspective view in FIG. 1 and the enlarged transverse cross-sectional view of the main portion in FIG. 5A, the obstacle detecting sensors S6 are disposed on the left and the right sides of the leading end portions of the left and the right forks 2L and 2R through mounting plates 20. The obstacle detecting sensor S6 is implemented by, for example, a photoelectric sensor, and detects an obstacle close to the leading end portion of the fork 2.

A signal (for example, ON/OFF signal) indicating presence or absence of an obstacle which is detected by the obstacle detecting sensor S6 is transmitted to the controller C. In a case where the obstacle detecting sensor S6 has detected an obstacle, the controller C emergently stops the unmanned forklift 1, for example.

(Load Detecting Sensor)

Figure 6A:
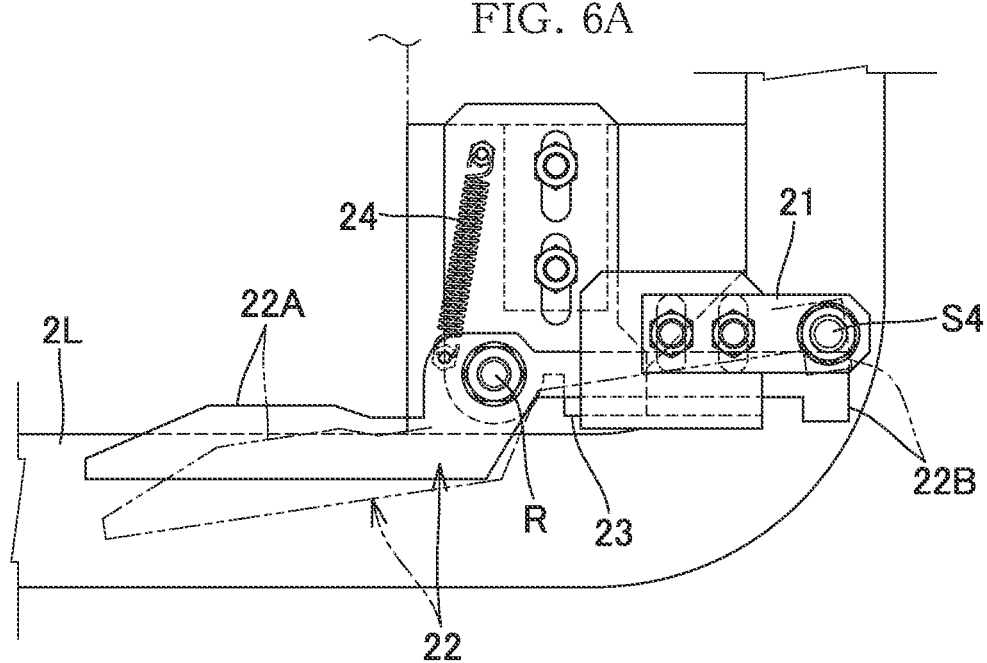
FIG. 6A is an enlarged view of a main portion in a region around a load detecting sensor as viewed from the left side.
Figure 6B:
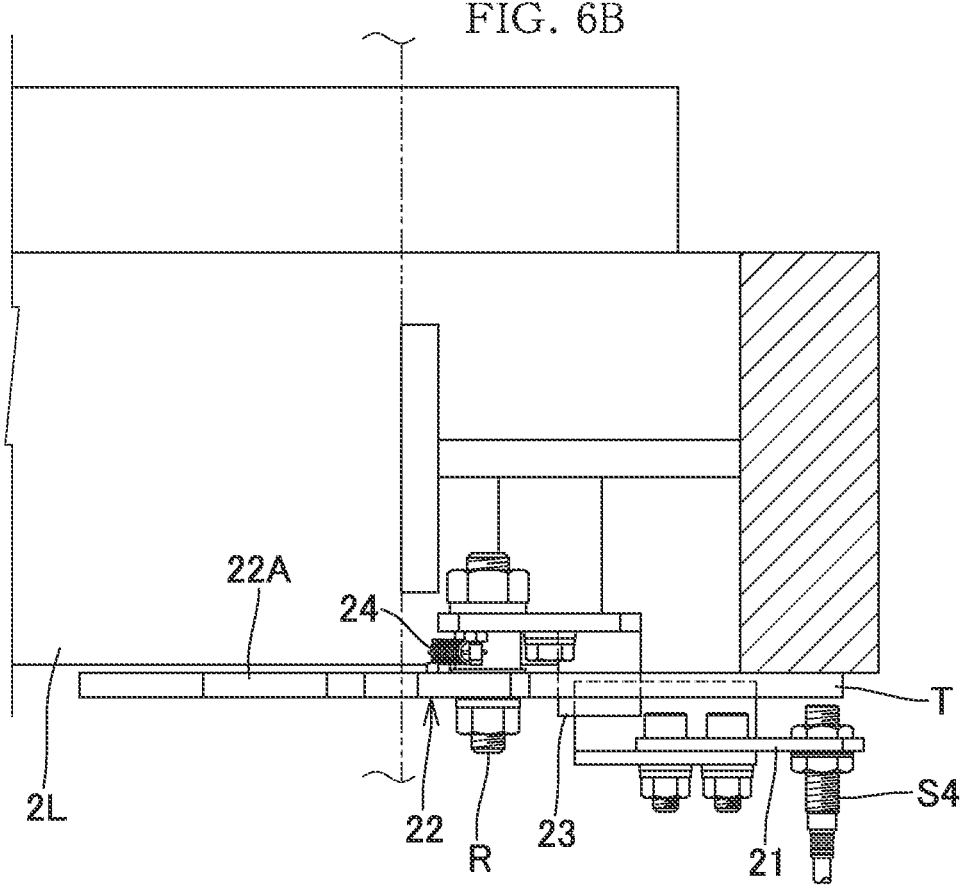
FIG. 6B is an enlarged transverse cross-sectional view of a main portion in a region around the load detecting sensor.

As illustrated in the left side view in FIG. 2, the enlarged view of the main portion in the left side view in FIG. 6A, and the enlarged transverse cross-sectional view of the main portion in FIG. 6B, the load detecting sensors S4 are disposed at root portions of the left and the right forks 2L and 2R in a state where the load detecting sensors S4 are supported by support plates 21. The load detecting sensor S4 is implemented by, for example, a proximity switch, and detects whether or not the pallet P is held by the fork 2.

As illustrated in FIG. 4, a signal (for example, ON/OFF signal) which is obtained through the detection by the load detecting sensor S4 and which indicates whether or not the pallet P is held by the fork 2 is transmitted to the controller C.

A structure around the load detecting sensor S4 disposed at the root portion of the left fork 2L will be described with reference to FIG. 6A and FIG. 6B. A seesaw plate 22 supported by a pivot R in the left-right direction is abutted and stopped by an abutment stop plate 23, and is elastically urged by a tension coil spring 24. In a case where the pallet P is not held by the fork 2, the seesaw plate 22 is stationary at a position indicated by a solid line in FIG. 6A. In a case where the pallet P is held by the fork 2 as illustrated in FIG. 2, the seesaw plate 22 oscillates so that an operation piece 22A is moved downward and a detection piece 22B is moved upward as indicated by an imaginary line in FIG. 6A. Thus, the detection piece 22B is detected by the load detecting sensor S4, whereby the pallet P held by the fork 2 can be detected.

(Self-Position Recognizing Sensor)

As illustrated in the perspective view in FIG. 1, the self-position recognizing sensor S5 is disposed on the upper surface of a frame K protruding upward from the main body 1A so as to be oriented upward. In other words, the self-position recognizing sensor S5 is disposed at a member which is not movable relative to the main body 1A. The self-position recognizing sensor S5 performs, for example, 3D imaging omnidirectionally in the horizontal direction at about 30° in the vertical visual field. The self-position recognizing sensor S5 is implemented by, for example, 3D-LiDAR, and is used in a laser simultaneous localization and mapping (SLAM) type self-position estimating method. The self-position estimation for the unmanned forklift 1 may be performed by an image SLAM type self-position estimating method or the like.

In the unmanned forklift 1 controlled by the sensors S1 to S6 described above, signal cables and feeder cables of the sensors S3, S4, S6 disposed at a member which is movable relative to the main body 1A are connected to a power supply and the controller C in the main body 1A via a cable bear 8 illustrated in FIG. 1.

<Image Obtaining Section>

As illustrated in FIG. 4, the processor 10 has an image obtaining section 11. The image obtaining section 11 obtains a taken image from the imaging device S1. For example, the imaging device S1 takes an image of the target pallet P1 illustrated in FIG. 2 or FIG. 3. The image obtaining section 11 obtains a taken image of the target pallet P1 from the imaging device S1.

<Pallet Type Identification Section>

As illustrated in FIG. 4, the processor 10 has a pallet type identification section 12. The pallet type identification section 12 has, for a plurality of types of pallets P, a learning model obtained by machine learning for a combination of an image of each pallet P and a type of the pallet P. The pallet type identification section 12 identifies a type of the target pallet P1 by inputting, to the learning model, the taken image of the target pallet P1, which is obtained by the image obtaining section 11.

Figure 7:
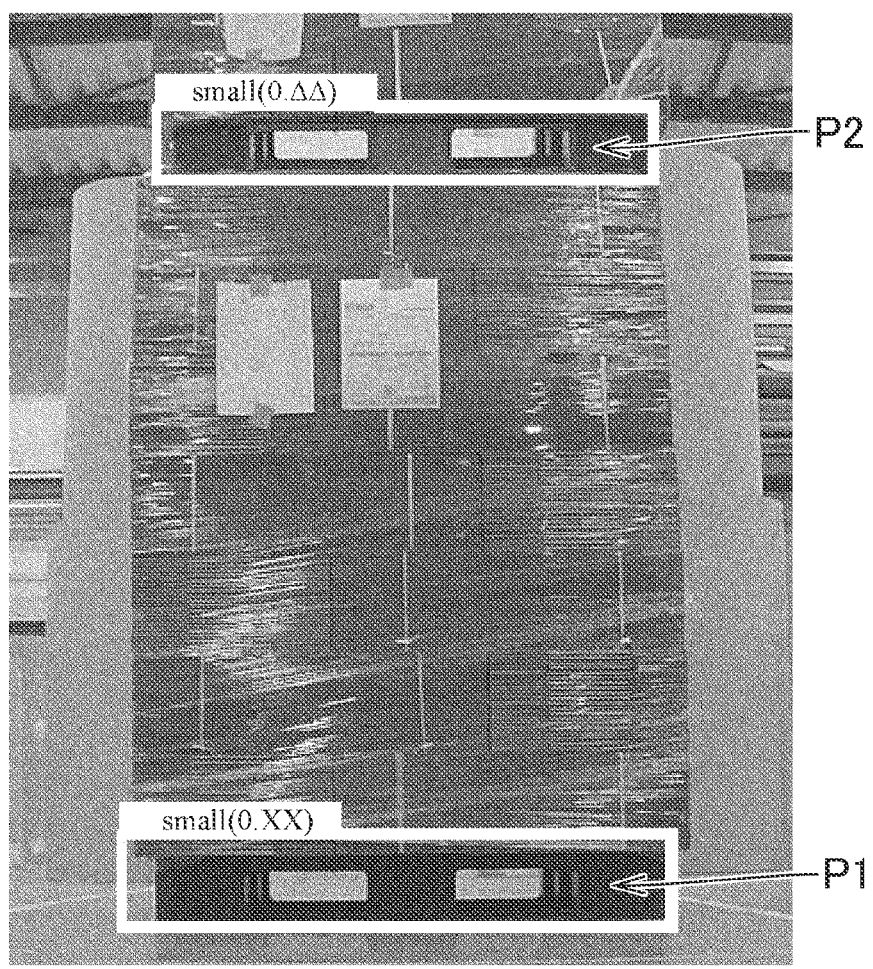
FIG. 7 illustrates an example of an image in a state where types of target pallets have been identified by a pallet type identification section.

FIG. 7 illustrates an example of an image showing a state where the pallet type identification section 12 has identified a type of a target pallet. In this example, the pallet type identification section 12 identifies a type of the target pallet P1 on the floor N as "small" and identifies a type of a target pallet P2 on a load on the target pallet P1 as "small". The pallet type identification section 12 can identify, for example, a type of a pallet such as "small", "medium", and "large", and can display, on the image, a probability (likelihood) of the identified type of the pallet such as (0.XX) and (0.ΔΔ) in FIG. 7.

<Pallet Position/Shape Obtaining Section>

As illustrated in FIG. 4, the processor 10 has a pallet position/shape obtaining section 13. For example, the pallet position/shape obtaining section 13 obtains position/shape data of the target pallet P1 from the distance measuring device S2 that has measured a distance to the target pallet P1 at a predetermined stop position at which the unmanned forklift 1 illustrated in FIG. 2 or FIG. 3 is distant from the target pallet P1 over a predetermined distance E. The position/shape data of the target pallet P1 is, for example, points data of a height including the insertion opening Q of the target pallet P1.

<Pallet Deviation Detection Section>

As illustrated in FIG. 4, the processor 10 has a pallet deviation detection section 14. The pallet deviation detection section 14 previously stores the position/shape data of each of a plurality of types of the pallets P. The position/shape data of each of the pallets P, which is previously stored in the pallet deviation detection section 14, is position/shape data of each of the pallets P, which is obtained by the pallet position/shape obtaining section 13 from the distance measuring device S2 that has measured a distance to each of the pallets P at the predetermined stop position of the unmanned forklift 1. The position/shape data of each of the pallets P is, for example, points data of a height including the insertion opening Q of the pallet P.

The pallet deviation detection section 14 performs comparison between the stored position/shape data corresponding to the type of the target pallet P1, which is identified by the pallet type identification section 12, i.e., the position/shape data of the pallet P corresponding to the type of the target pallet P1 in the previously stored pallets P data as described above, and the position/shape data of the target pallet P1, which is obtained by the pallet position/shape obtaining section 13, so as to detect deviation of a position and an orientation of the target pallet P1 from a normal position.

Figure 8A:
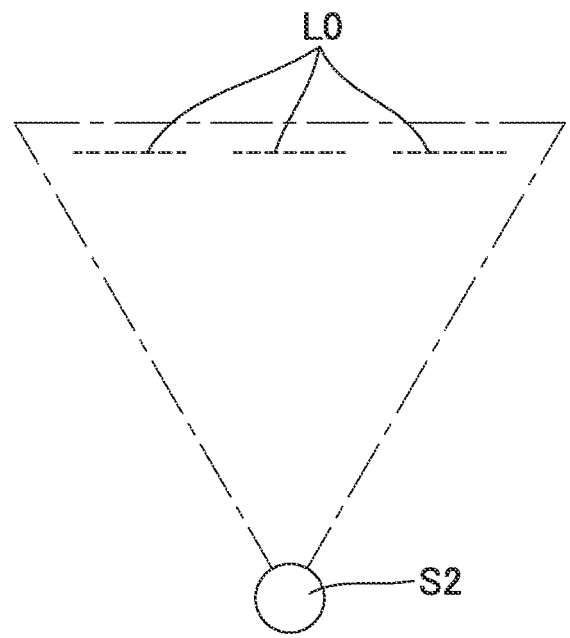
FIG. 8A is a schematic plan view of a line segment based on stored pallet points data corresponding to each of the types of the target pallet.

L0 in the schematic plan view illustrated in FIG. 8A represents, for example, a line segment based on the stored points data of the height including the insertion opening Q of the pallet P corresponding to the target pallet P1 in FIG. 2 or FIG. 3, regarding pallets on the floor N. As described above, the pallet deviation detection section 14 stores data of the line segment L0 as illustrated in FIG. 8A for each of a plurality of types of the pallets P.

Figure 8B:
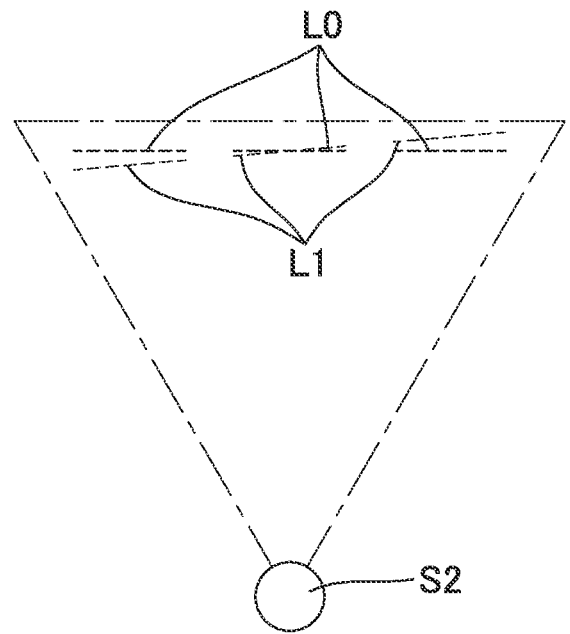
FIG. 8B is a schematic plan view illustrating a state where the line segment illustrated in FIG. 8A overlaps a line segment based on points data of the target pallet which is obtained by a pallet position/shape obtaining section.

As illustrated in the schematic plan view in FIG. 8B, the pallet deviation detection section 14 performs comparison between the line segment L0 and a line segment L1 based on points data, of the height including the insertion opening Q of the target pallet P1, which is obtained by the pallet position/shape obtaining section 13, with overlapping the line segments L0 and L1.

The pallet deviation detection section 14 having such a structure compares the line segments L0 and L1 with each other under a condition that the line segments L0 and L1 overlap each other, and obtains deviation, thereby reducing calculation cost. Moreover, the points data of the height can be obtained merely by scanning in the horizontal direction, so that the distance measuring device S2 for measuring a distance to the target pallet P1 need not be moved upward and downward, whereby time for detecting the deviation of the position and the orientation of the target pallet P1 can be shortened.

<Position at which the Imaging Device Takes an Image and Position at which the Distance Measuring Device Measures a Distance>

The unmanned forklift 1 is stopped when the imaging device S1 takes an image of the target pallet P1 and the pallet type identification section 12 identifies a type of the target pallet P1. A position at which the unmanned forklift 1 is stopped at this time is set as a first stop position. The unmanned forklift 1 is also stopped when the distance measuring device S2 measures a distance to the target pallet P1 and the pallet position/shape obtaining section 13 obtains the position/shape data of the target pallet P1. A position at which the unmanned forklift 1 is stopped at this time is set as a second stop position.

For example, the position at which the unmanned forklift 1 illustrated in FIG. 2 and FIG. 3 is distant from the target pallet P1 over the predetermined distance E may be set as the first stop position and the second stop position. In this situation, the first stop position and the second stop position may be set as the same position. Alternatively, the second stop position may be set as a position closer to the target pallet P1 than the first stop position is. When the second stop position is set as a position closer to the target pallet P1 than the first stop position is, the pallet deviation detection section 14 can more accurately detect deviation of the position and the orientation of the target pallet P1.

<Error Determination Section>

As illustrated in FIG. 4, the processor 10 has a deviation error determination section 15. The deviation error determination section 15 determines that an error occurs in a case where deviation, detected by the pallet deviation detection section 14, of the position and the orientation of the target pallet P1 from the normal position is greater than a predetermined threshold value.

In a case where the fork 2 cannot be inserted into the target pallet P1 due to the deviation being great, the deviation error determination section 15 having such a structure performs the error determination before the fork insertion operation, whereby an interference accident between the target pallet P1 and the fork 2 can be prevented. For example, the threshold value of the deviation as a criterion in the error determination is a maximum value in a range from a predetermined stop position at which the unmanned forklift 1 is stopped, to a position at which the unmanned forklift 1 is self-propelled from the predetermined stop position and the fork 2 can be inserted into the target pallet P1. Here, at the predetermined stop position at which the unmanned forklift 1 is stopped, the distance measuring device S2 measures a distance to the target pallet P1 and the pallet position/shape obtaining section 13 obtains the position/shape data of the target pallet P1.

<Pallet Shape Determination Section>

As illustrated in FIG. 4, the processor 10 has a pallet shape determination section 16. The pallet shape determination section 16 performs comparison between shape data of the target pallet P1, which is obtained by the pallet position/shape obtaining section 13, and previously stored shape data of the same type of pallet as the target pallet P1. In a case where the difference therebetween is greater than a predetermined threshold value, the obtained shape data of the target pallet P1 is determined as being erroneous.

For example, in a case where another object (for example, carton) is placed just lateral to the target pallet P1, the size of the target pallet P1 may be erroneously detected due to the object. Even in such a case, the pallet shape determination section 16 having such a structure performs comparison with a stored shape of the pallet corresponding to the type of the target pallet P1, which is identified by the pallet type identification section 12, thereby determining an error. Thus, an interference accident of the fork 2 with the insertion opening Q of the target pallet P1, resulting in stop of the operation, can be prevented.

<Pallet Stacking Determination Section>

As illustrated in FIG. 4, the processor 10 has a pallet stacking determination section 17. The pallet stacking determination section 17 performs image processing as illustrated in FIG. 7 on the taken image of the target pallet (for example, P1, P2 in FIG. 7), which is obtained by the image obtaining section 11, whereby the number of pallets in a specific range in which the target pallets P1, P2 are preset to be present is calculated to determine presence or absence of stacking.

For example, in a case where the number of pallets in the specific range is two as illustrated in FIG. 7, it can be determined that a stacking operation of stacking, as a second tier, a pallet and a load which are transported from another place onto the first-tier pallet and load is impossible. In a case where the number of pallets in the specific range is one, it can be determined that the stacking operation is possible. In a case where the number of pallets in the specific range is one, it can be determined that an unstacking operation of picking up the second-tier pallet and load and transporting the pallet and load to another place is impossible. In a case where the number of pallets in the specific range is two, it can be determined that the unstacking operation is possible. If the stacking operation is preset to be impossible in a case when the number of pallets in the specific range is greater than or equal to two, it can be determined that the stacking operation is impossible in a case when the number of pallets in the specific range is greater than or equal to two.

The pallet stacking determination section 17 having such a structure can assuredly determine, only by calculating the number of pallets in the specific range in front of the unmanned forklift 1, presence or absence of stacking of pallets without erroneously detecting a pallet other than a target pallet. Accordingly, such erroneous detection can be prevented in which a pallet, other than a target pallet, which is placed lateral to the target pallet on the floor N, is also detected, and the number of the pallets is calculated as two, for example. Therefore, erroneous determination that stacking is determined as being impossible even in a case where the stacking is possible can be avoided.

For example, in the example of the image in FIG. 7, an image of a portion around the pallet P1 on the floor and an image of a portion around the pallet P2 at the upper tier are different from each other. Accordingly, if a learning model obtained by machine learning in which multiple images including pallets on the floor are prepared and the pallets on the floor are used as teaching data, for example, the pallet P2 at the upper tier may not be identified.

Therefore, according to the preferable pallet stacking determination section 17, pallet images of pallets are previously learned by machine learning as teaching data for a plurality of upper and lower tiers. In the pallet stacking determination section 17 having such a configuration, when an image of a portion around a pallet is different depending on a tier of the pallet, learning is performed by using the different images of the portions around the pallets as teaching data, thereby enhancing pallet detection accuracy.

<Traveling Controller>

As illustrated in FIG. 4, the controller C has a traveling controller 18. The traveling controller 18 controls traveling of the unmanned forklift 1 in order to perform at least one of operations (A) and (B) described below. The traveling controller 18 may be provided in the managing device on the ground side.

(A) Operation including an operation of inserting the fork 2 into insertion openings of a target pallet by using the deviation detected by the pallet deviation detection section 14.

(B) Stacking operation of stacking the pallet P and the load W held by the fork 2 inserted into the insertion opening Q, onto a load on a target pallet, according to the deviation of the target pallet.

For example, as illustrated in FIG. 3, the unmanned forklift 1 picks up the target pallet P1 and the load W on the floor N and transports the target pallet P1 and the load W to another place. Furthermore, as illustrated in FIG. 2, the unmanned forklift 1 stacks the pallet P transported from another place onto the load W on the target pallet P1 on the floor N. Moreover, the unmanned forklift 1 picks up the target pallet P2 and the load W stacked on the load W on the target pallet P1 on the floor N as illustrated in FIG. 7 and transports the target pallet P2 and the load W to another place.

<Example of Structure of Fork Width Change Device>

Figure 9:
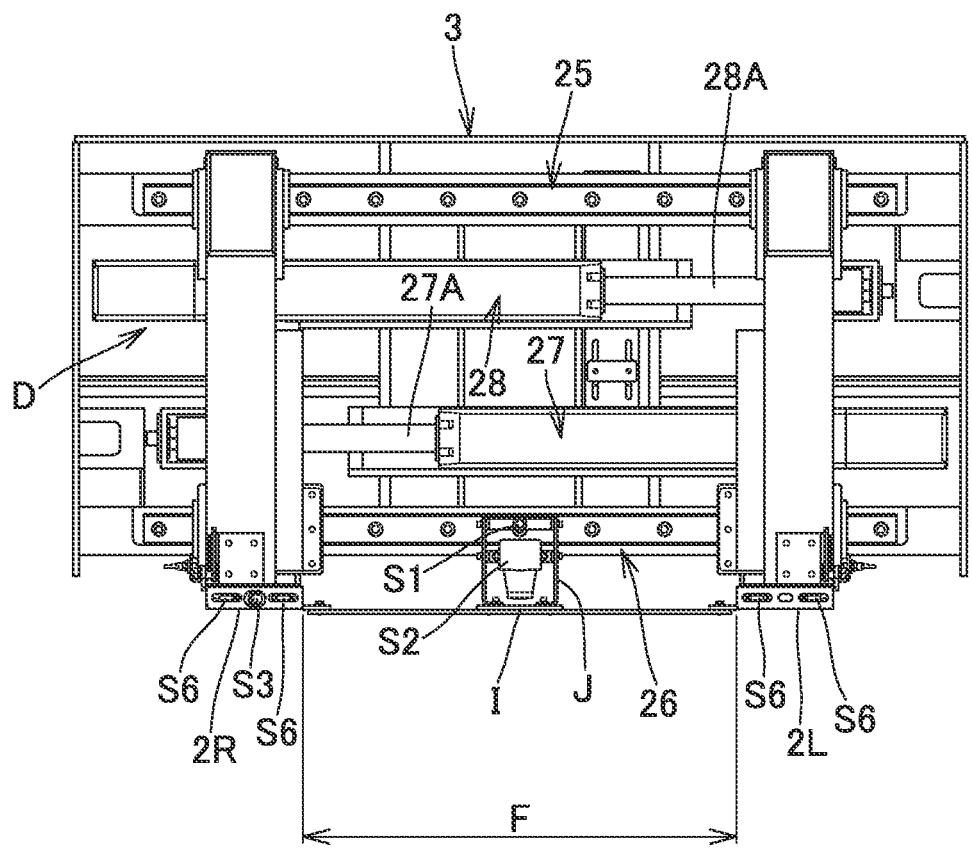
FIG. 9 is a front view of a fork width change device.

As illustrated in the front view in FIG. 9, the right fork 2R and the left fork 2L are guided so as to be movable in the left-right direction through linear guides 25, 26. An actuator of the fork width change device D for changing the interval F between the right fork 2R and the left fork 2L is embodied by, for example, electric cylinders 27 and 28 which have position sensors. Specifically, the electric cylinder 27 is driven to cause a piston 27A to advance/recede, whereby the right fork 2R is moved in the left-right direction. The electric cylinder 28 is driven to cause a piston 28A to advance/recede, whereby the left fork 2L is moved in the left-right direction. The electric cylinders 27 and 28 which have position sensors may be implemented by, for example, oil-hydraulic cylinders having position sensors.

Figure 10:
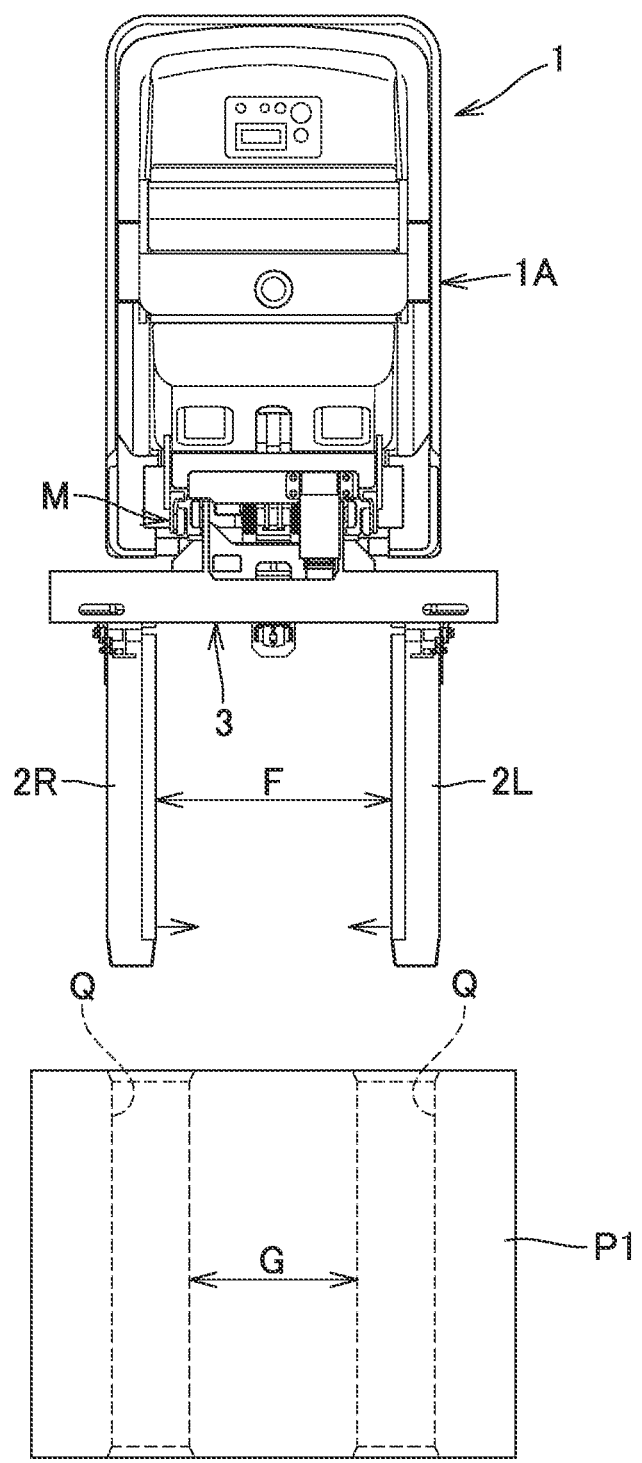
FIG. 10 is a schematic plan view for illustrating an operation of causing the fork width change device to narrow a fork width.
Figure 11:
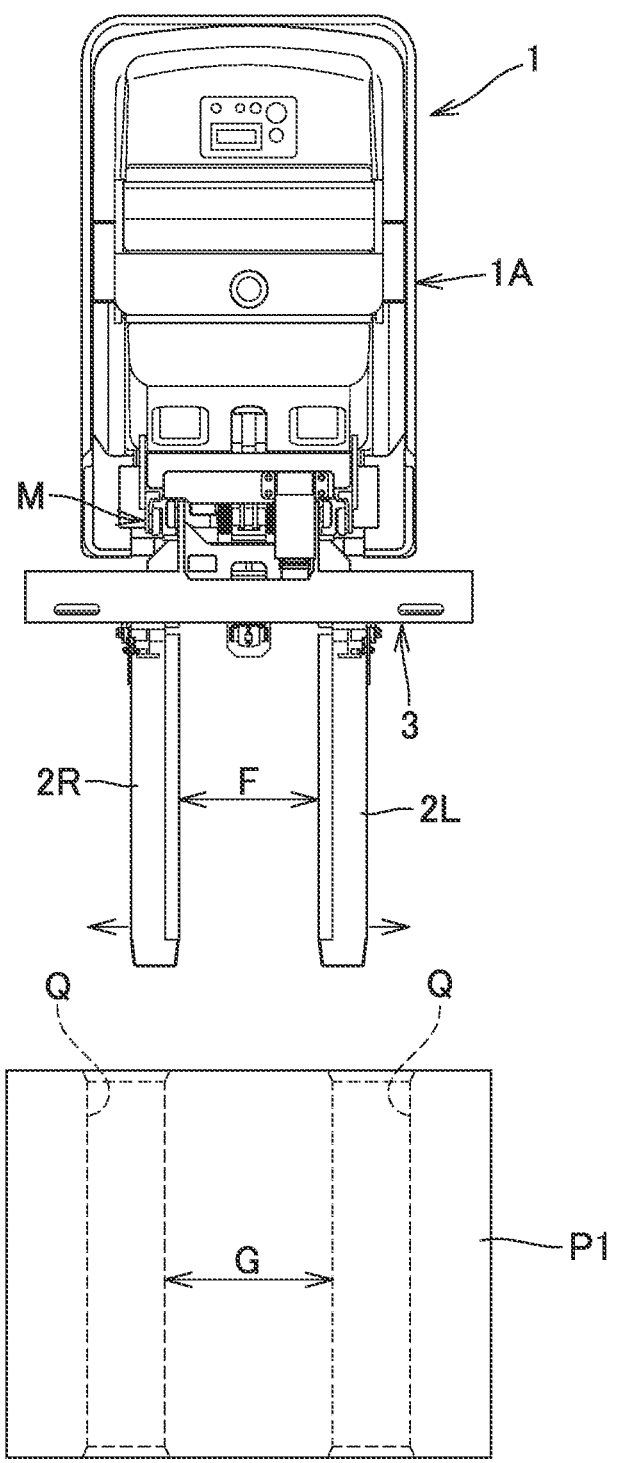
FIG. 11 is a schematic plan view for illustrating an operation of causing the fork width change device to widen a fork width.

As illustrated in the schematic plan view in FIG. 10, in a case where the interval F of the fork is greater than a width G between the insertion openings Q and Q of the target pallet P1, the fork width change device D is operated so as to narrow the interval F of the fork as indicated by arrows at the leading ends of the fork. As illustrated in the schematic plan view in FIG. 11, in a case where the interval F of the fork is less than the width G between the insertion openings Q and Q of the target pallet P1, the fork width change device D is operated so as to widen the interval F of the fork as indicated by arrows at the leading ends of the fork.

The fork width change device D can change the interval F between the left and the right forks 2L and 2R so as to correspond to the interval G between the insertion openings Q and Q of the target pallet P1 depending on a type of the target pallet P1, which is obtained by the pallet type identification section 12. Therefore, the unmanned forklift 1 need not be prepared for each of target pallets having different intervals G between the insertion openings Q and Q, and one unmanned forklift 1 can transport a plurality of types of pallets by operating the fork width change device D so as to obtain the interval F between the forks 2L and 2R corresponding to the interval G between the insertion openings Q and Q.

<Operation Using Detection Results from Distance Sensor and Load Detecting Sensor>

The unmanned forklift 1 performs, for example, operations as described below by using a detection result from the distance sensor S3 for detecting presence or absence of an object in front thereof, and a detection result from the load detecting sensor S4 for detecting whether or not the pallet P is held by the fork 2.

That is, as illustrated in FIG. 2, the unmanned forklift 1 performs a stacking operation of stacking the pallet P and the load W as the second tier onto the load W on the target pallet P1 in the first tier. The unmanned forklift 1 performs an unstacking operation of picking up the second-tier pallet P2 and load on the load on the first-tier pallet P1 illustrated in FIG. 7 and transporting the pallet P2 and load to another place.

In a case where the stacking operation is performed, the distance sensor S3 can detect a height of the load W on the first-tier pallet P1, and the load detecting sensor S4 can detect a height at which the fork 2 is to be withdrawn after the stacking operation. In a case where the unstacking operation is performed, the distance sensor S3 can detect a height of the insertion opening of the second-tier pallet P2, and the load detecting sensor S4 can detect a state where the pallet P2 and the load to be held in the unstacking operation are held by the fork 2. Therefore, the distance sensor S3 and the load detecting sensor S4 allow the stacking operation and/or the unstacking operation to be assuredly performed.

(Example of Stacking Operation)

In the unmanned forklift 1, the imaging device S1 (FIG. 1) takes an image of a portion in front thereof at a position distant from the target pallet P1 over the predetermined distance E as illustrated in FIG. 2, and the image obtaining section 11 obtains the taken image from the imaging device S1. The taken image of the target pallet P1, which is obtained by the image obtaining section 11, is inputted to the learning model of the pallet type identification section 12, and the pallet type identification section 12 identifies a type of the target pallet P1.

The distance measuring device S2 (FIG. 1) measures a distance to the target pallet P1 and the pallet position/shape obtaining section 13 obtains the position/shape data of the target pallet P1. The pallet deviation detection section 14 performs comparison between the stored position/shape data corresponding to the type of the target pallet P1, which is identified by the pallet type identification section 12, and the position/shape data of the target pallet P1, which is obtained by the pallet position/shape obtaining section 13, thereby detecting deviation of the position and the orientation of the target pallet P1 from the normal position.

The pallet stacking determination section 17 performs image processing on the taken image of the target pallet P1, which is obtained by the image obtaining section 11, whereby the number of pallets in the specific range in which the target pallet P1 is preset to be present is calculated to determine presence or absence of stacking. In other words, in FIG. 2, the number of pallets in the specific range is one, and the pallet stacking determination section 17 thus determines that stacking is possible.

Figure 12A:
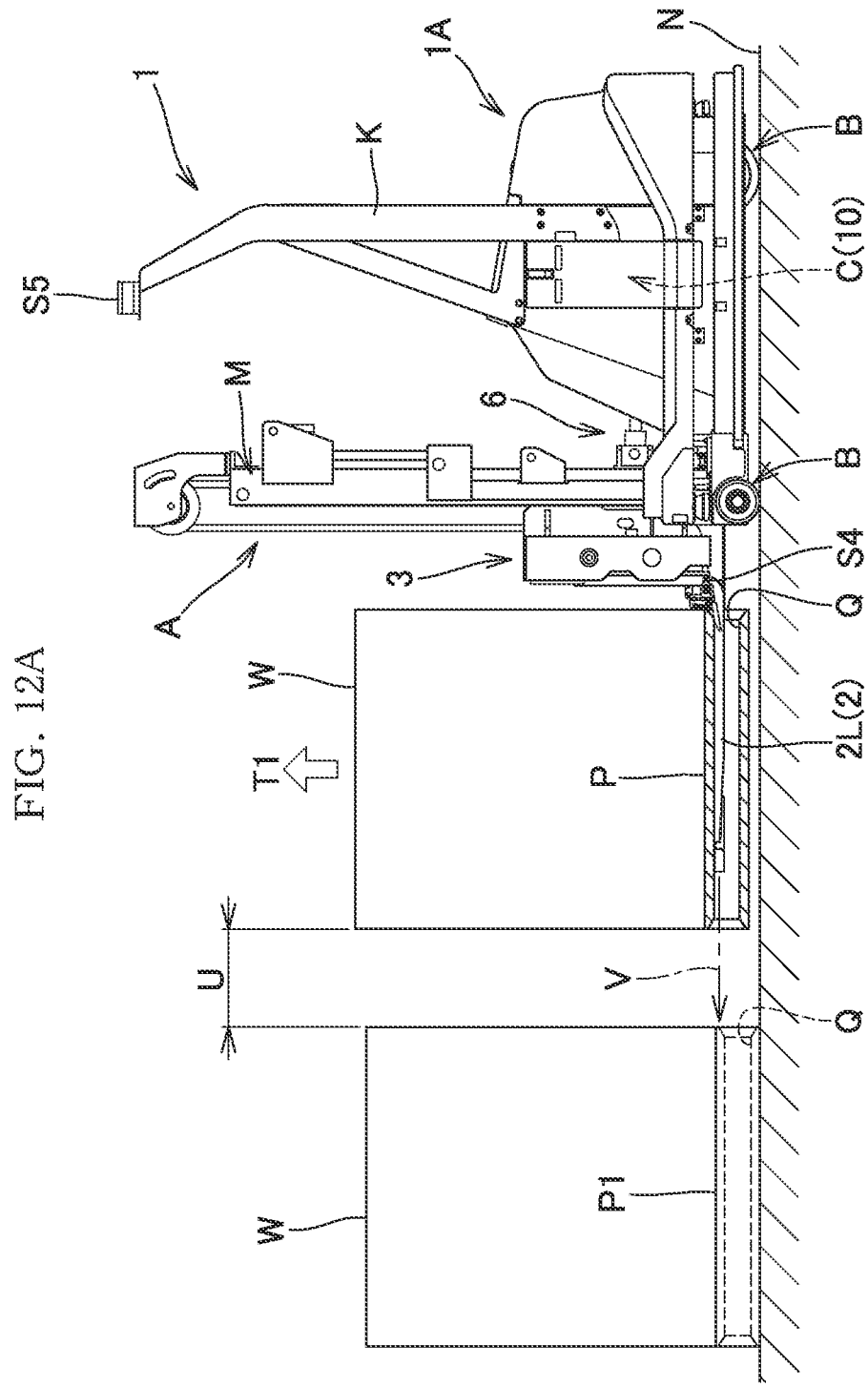
FIG. 12A illustrates an example of a stacking operation and illustrates a state where the unmanned forklift that has approached a target pallet stops in front of the target pallet at a predetermined distance.

The height of the fork 2 is lowered, the unmanned forklift 1 is moved forward to approach the target pallet P1, and the unmanned forklift 1 is stopped at a position at which the target pallet P1 and the pallet P are distant from each other over, for example, a predetermined distance U as illustrated in FIG. 12A. At this position, as indicated by an arrow V in FIG. 12A, the distance sensor S3 (FIG. 1) for detecting presence or absence of an object detects the target pallet P1.

Figure 12B:
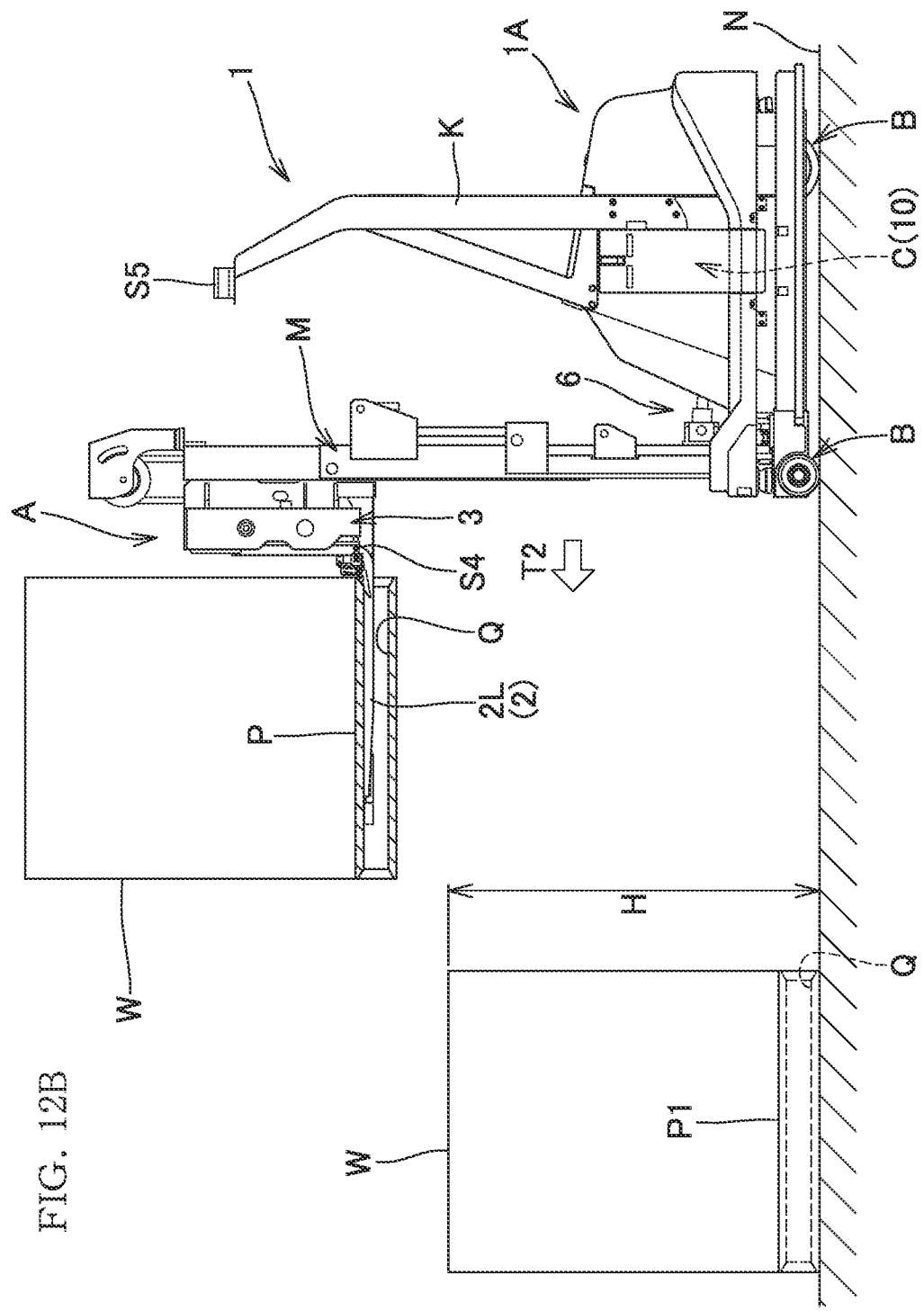
FIG. 12B illustrates an example of the stacking operation and illustrates a state where the forks of the unmanned forklift are moved upward, a distance sensor detects a height of a load on the target pallet, and thereafter, the forks are further moved upward by a predetermined distance and stopped.

As indicated by an arrow T1 in FIG. 12A, the fork 2 is moved upward, and a position at which the distance sensor S3 disposed at the leading end of the fork 2 no longer detects the load W on the target pallet P1 is a position of a height H of the load W on the target pallet P1 illustrated in FIG. 12B. The fork 2 is further moved upward from the position at which the distance sensor S3 has not detected the load W, over a predetermined distance, as illustrated in FIG. 12B.

Figure 12C:
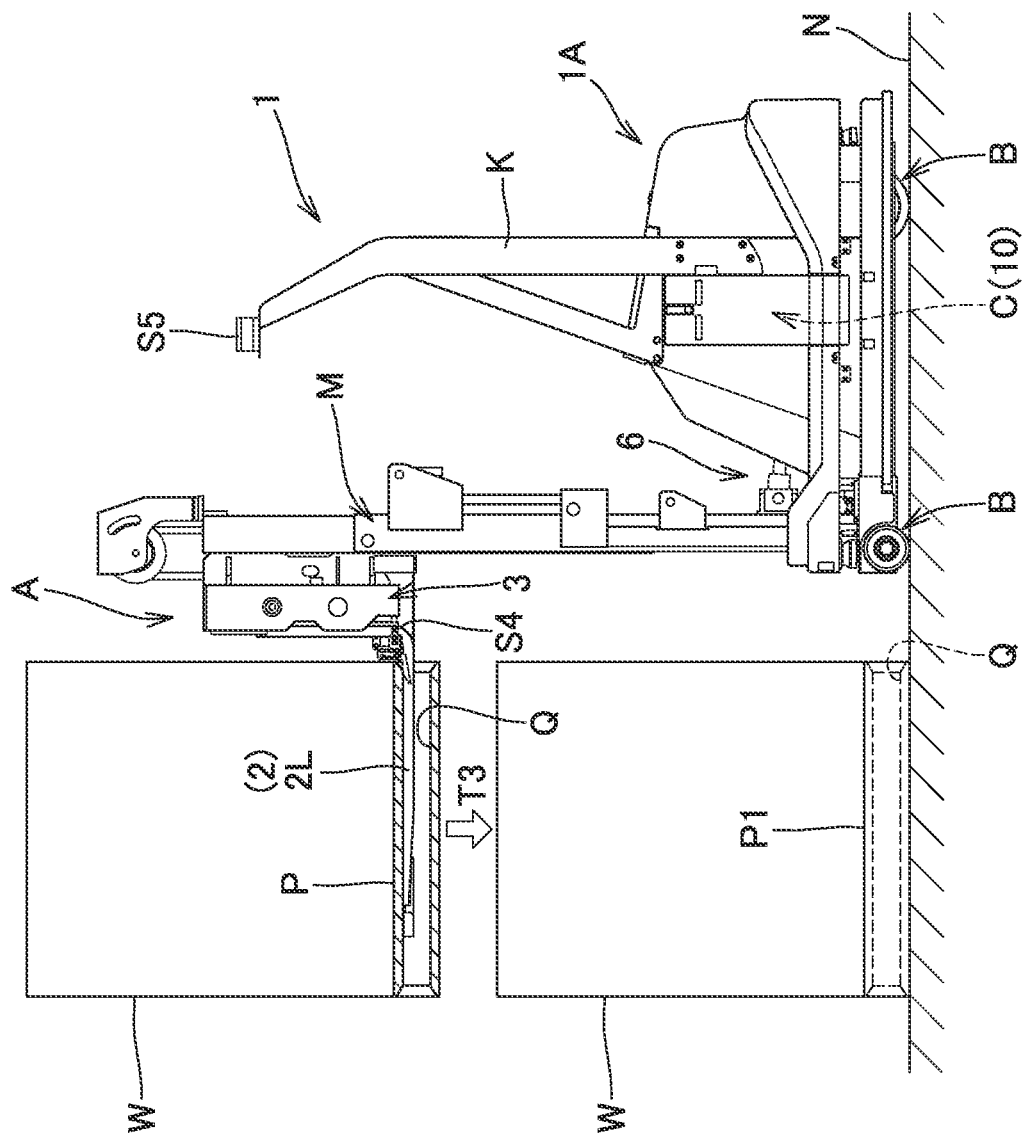
FIG. 12C illustrates an example of the stacking operation and illustrates a state where the unmanned forklift is moved forward by a predetermined distance, and a pallet and a load to be stacked are disposed above the target pallet and the load.

Then, as indicated by an arrow T2 in FIG. 12B, the unmanned forklift 1 is moved forward, and the unmanned forklift 1 is stopped at a position in FIG. 12C at which the pallet P overlaps the target pallet P1 at the vertically upper position above the target pallet P1 according to deviation of the position and the orientation of the target pallet P1, from the normal position, detected by the pallet deviation detection section 14.

Figure 12D:
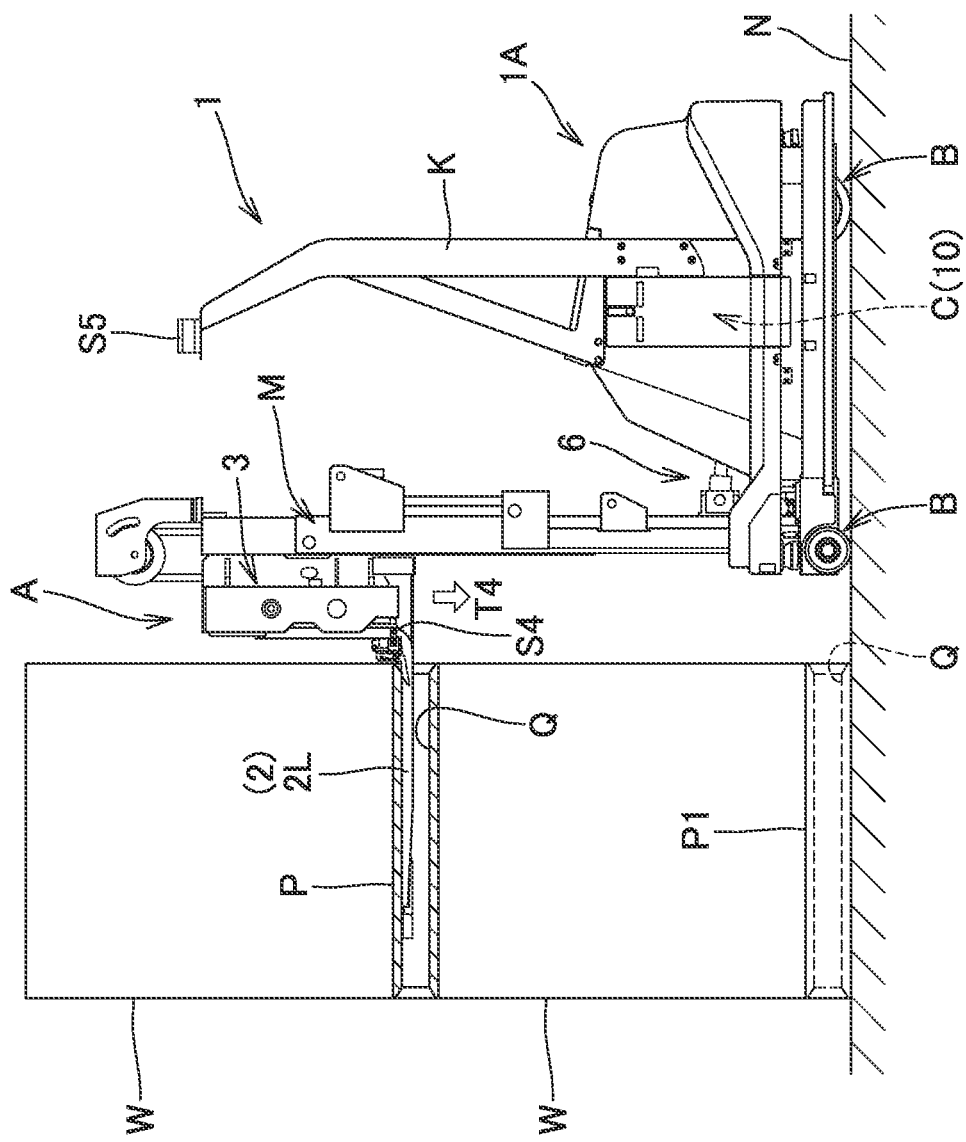
FIG. 12D illustrates an example of the stacking operation and illustrates a state at a moment when the forks are moved downward and the bottom of the pallet to be stacked is in contact with the upper face of the load on the target pallet.

Subsequently, as indicated by an arrow T3 in FIG. 12C, the fork 2 is moved downward, and the pallet P and the load W are stacked on the upper face of the load W on the target pallet P1 as illustrated in FIG. 12D. The fork 2 does not hold the pallet P at a position in FIG. 12E to which the fork 2 has been further moved downward as indicated by an arrow T4 in FIG. 12D. In other words, the load detecting sensor S4 detects a state where the pallet P is not held, whereby the downward movement of the fork 2 is stopped.

Figure 12E:
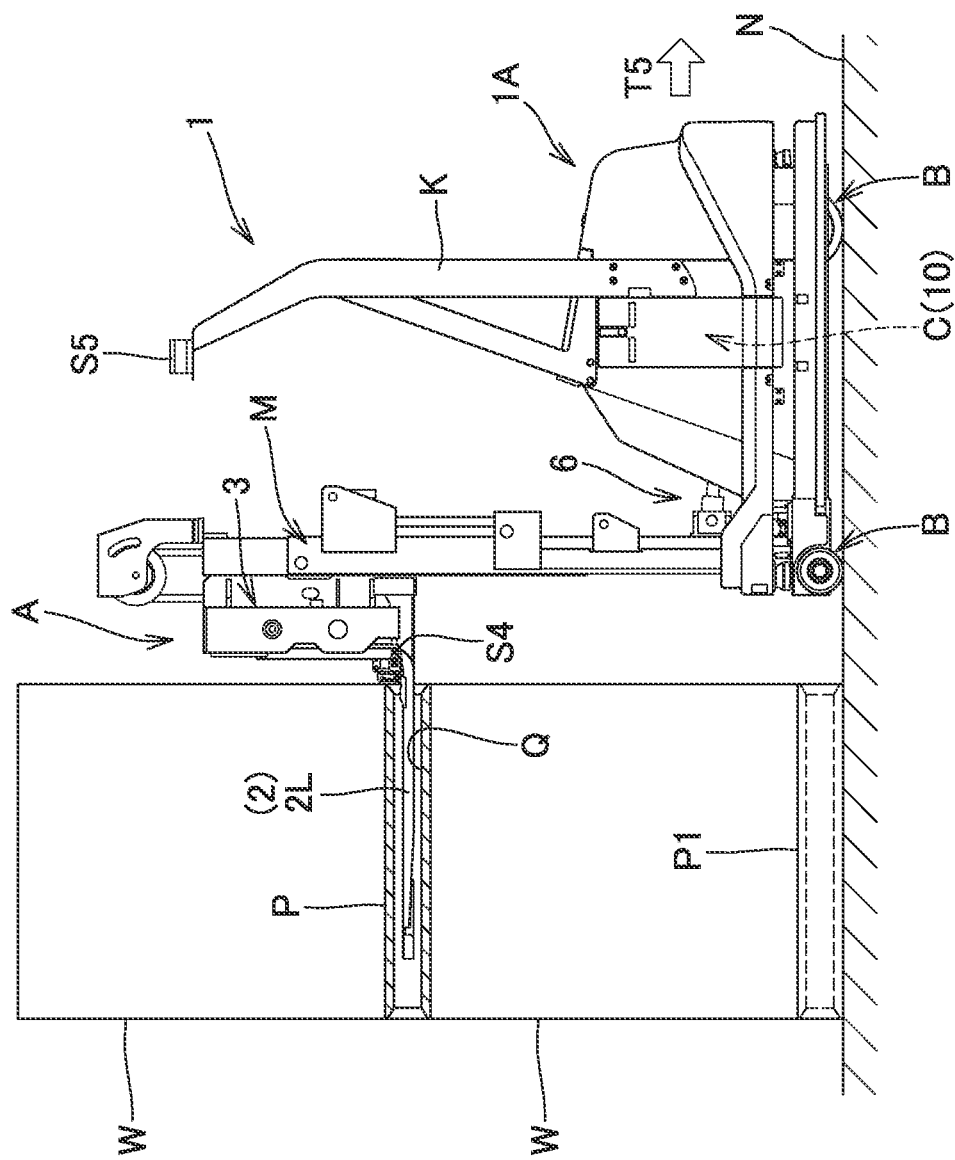
FIG. 12E illustrates an example of the stacking operation and illustrates a state where the forks are further moved downward and the load detecting sensor detects that no load is on the forks.

Thereafter, the unmanned forklift 1 is moved backward from the position illustrated in FIG. 12E as indicated by an arrow T5 in FIG. 12E, and the fork 2 is withdrawn from the pallet P, thereby completing the stacking operation.

(Example of Unstacking Operation)

An example of unstacking operation of, for example, picking up the second-tier pallet P2 and load on the load on the first-tier pallet P1 illustrated in FIG. 7 and transporting the pallet P2 and the load to another place will be described.

In a case where the second-tier pallet P2 is stacked so as to correspond to the first-tier pallet P1, the second-tier pallet P2 can be picked up based on the position and the orientation of the first-tier pallet P1.

In this case, the unmanned forklift 1 is stopped in front of the pallets P1 and P2 and the loads stacked as illustrated in FIG. 7, and the fork 2 is thereafter moved upward. When the distance sensor S3 disposed at the leading end of the fork 2 no longer detects an object in front thereof during the detection, by the distance sensor S3, of an object in front thereof, upward movement of the fork 2 is stopped. In this state, the left and the right forks 2L and 2R are positioned in front of the insertion openings Q, Q of the second-tier pallet P2. Therefore, the unmanned forklift 1 is moved forward over a predetermined distance, and the fork 2 is thereafter moved upward over a predetermined distance. The fork 2 holds the load in a state where the load detecting sensor S4 detects the pallet P2. Therefore, after the fork 2 is moved upward over the predetermined distance, the upward movement of the fork 2 is stopped and the unmanned forklift 1 is moved backward.

In the unstacking operation as described above, in a case where, for example, the load on the pallet P1 is not covered with a stretch film in the example of the image illustrated in FIG. 7, the position, in the left-right direction, of a gap between loads, such as a left-side carton and a right-side carton, may coincide with the position of the insertion opening Q, Q of the pallet P1, P2 in the left-right direction. In such a case, the distance sensor S3 disposed at the leading end of the fork 2 may not detect an object in front thereof at the position of the gap between the left-side carton and the right-side carton. If the distance sensor S3 disposed at the leading end of the fork 2 does not detect an object in front thereof, the upward movement of the fork 2 is stopped, and the left and the right forks 2L and 2R are erroneously determined as being positioned in front of the insertion openings Q, Q of the second-tier pallet P2. Thus, failure that the unstacking operation cannot be appropriately performed may occur.

As one of measures for overcoming such a failure, an approximate height of the bottom of the second-tier pallet P2 may be estimated based on the image data, when the types of the target pallets P1 and P2 are identified at the first stop position by the pallet type identification section 12. For example, a ratio between the number of pixels of the width of the first-tier pallet P1 and the number of pixels of a distance, in the up-down direction, of the first-tier pallet P1 and the second-tier pallet P2 is obtained in an image (for example, FIG. 7) of a state where the pallet type identification section 12 has identified the types of the target pallets P1, P2. Furthermore, the actual dimensions of the width and the height of the pallet P1 are obtained based on the previously stored shape data of the same type of pallet as the target pallet P1. The approximate height of the bottom of the second-tier pallet P2 can be estimated based on the ratio and the actual dimensions.

The unstacking operation is performed under the condition that the insertion openings Q, Q of the second-tier pallet P2 have been recognized as being above the approximate estimated height of the bottom of the second-tier pallet P2. Specifically, after the unmanned forklift 1 is stopped in front of the stacked pallets P1, P2 and loads, the fork 2 is moved upward, and the upward movement of the fork 2 is stopped at a position above the approximate estimated height of the bottom of the second-tier pallet P2 in a state where the distance sensor S3 no longer detects an object in front thereof. Through such an operation, the failure can be overcome.

(Another Example of Unstacking Operation)

The 2D-LiDAR as the distance measuring device S2 is mounted to the lift bracket 3 that is moved upward and downward together with the fork 2, and the position/shape data and the height of the second-tier pallet P2 are detected while the fork 2 is moved upward and downward. The 2D-LiDAR is mounted to the lift bracket 3 at a place corresponding to a mid-position between the root portions of the forks 2L and 2R. Alternatively, the distance measuring device S2 mounted to the main body 1A of the unmanned forklift 1 as illustrated in FIG. 1 is changed to 3D-LiDAR, thereby allowing the position/shape data and the height of the second-tier pallet P2 to also be detected. In these cases, the distance sensor S3 disposed at the leading end of the fork 2 is used to check the interference between the pallets P1 and P2.

For example, after the unmanned forklift 1 detects the position/shape data and the height of the second-tier pallet P2 for the pallets P1, P2 stacked as illustrated in FIG. 7, the unmanned forklift 1 is moved forward over a predetermined distance so as to allow the left and the right forks 2L and 2R to align with the insertion openings Q and Q of the second-tier pallet P2 in a state where the fork 2 is disposed at the height of the insertion openings Q of the pallet P2. Next, the fork 2 is moved upward and the fork 2 holds the load in a state where the load detecting sensor S4 detects the pallet P2. Therefore, after the fork 2 is moved upward over a predetermined distance, the upward movement of the fork 2 is stopped and the unmanned forklift 1 is moved backward.

In the above-described embodiments of the present invention, the target pallet is disposed on the floor N. However, the target pallet may be disposed on a cargo bed of a truck. An example of an operation in which the target pallet is on a cargo bed of a truck will be described below.

(1) Devanning of First-Tier Pallet and Load in Truck Cargo Bed

Devanning of a first-tier pallet and load in a truck cargo bed is performed in the same operation as unstacking of the second-tier pallet P2 and load in the "Another example of unstacking operation".

(2) Devanning (Unstacking) of Pallet and Load at Upper Tier Between Pallets and Loads at Upper and Lower Two Tiers in Truck Cargo Bed Devanning (unstacking) of a pallet and a load at the upper tier between pallets and loads at the upper and lower two tiers in a truck cargo bed is performed in the same operation as unstacking of the second-tier pallet P2 and load in the "Another example of unstacking operation".

When the pallets and loads at the upper and lower two tiers in a truck cargo bed are stacked in a manner that the pallet at the upper tier is stacked so as to correspond to the pallet at the lower tier, devanning of the pallet and load at the upper tier in the truck cargo bed may be performed in the following manner.

That is, position/shape data and a height of the pallet at the lower tier in the cargo bed are detected in the same operation as unstacking of the second-tier pallet P2 and load in the "Another example of unstacking operation". When the fork 2 is moved upward after the unmanned forklift 1 is stopped in front of the pallets and loads at the upper and lower two tiers, the upward movement of the fork 2 is stopped under a condition that the distance sensor S3 disposed at the leading end of the fork 2 no longer detects an object in front thereof during the detection, by the distance sensor S3, of an object in front thereof. The devanning of the pallet and load at the upper tier in the truck cargo bed is performed by moving the unmanned forklift 1 forward over a predetermined distance, moving the fork 2 upward over a predetermined distance, stopping the upward movement of the fork 2 by the load detecting sensor S4, and moving the unmanned forklift 1 backward.

(3) Vanning (Stacking) of Pallet and Load onto First-Tier Pallet and Load in Truck Cargo Bed The 2D-LiDAR as the distance measuring device S2 is mounted to the lift bracket 3 that is moved upward and downward together with the fork 2, and detects position/shape data and a height of the first-tier pallet in the truck cargo bed while the fork 2 is moved upward and downward. Alternatively, by changing, to 3D-LiDAR, the distance measuring device S2 mounted to the main body 1A of the unmanned forklift 1 as illustrated in FIG. 1, the position/shape data and the height of the first-tier pallet in the truck cargo bed can also be detected.

In the "Example of stacking operation", the target pallet P1 is replaced with the first-tier pallet in the truck cargo bed. Vanning (stacking) of the pallet and load onto the first-tier pallet and load in the truck cargo bed is performed.

In the examples of the operations (1) to (3), a learning model used upon the identification of a type of a pallet is a learned model obtained by machine learning in which an image of the first-tier pallet (pallet at the lower tier) or the second-tier pallet (pallet at the upper tier) in the truck cargo bed is used as teaching data.

<Effects of the Unmanned Forklift According to the Embodiments of the Present Invention>

Even if objects to be transported by the unmanned forklift 1 are a plurality of types of pallets having different shapes, there is no limits for types of pallets that can be handled. Even in such a case, a taken image of a target pallet, which is obtained by the image obtaining section 11, is inputted to the learning model, of the pallet type identification section 12, which is obtained by machine learning for a combination of an image of each pallet and a type of the pallet, and the pallet type identification section 12 identifies a type of the target pallet. By inputting the taken image, the pallet type identification section 12 identifies the type of the target pallet with high accuracy. The pallet deviation detection section 14 can perform comparison between the stored position/shape data corresponding to the type of the target pallet which is identified by the pallet type identification section 12, and the position/shape data of the target pallet, which is obtained by the pallet position/shape obtaining section 13.

Thus, deviation of a position and an orientation of the target pallet from the normal position of the pallet can be detected with high accuracy. In addition, erroneous recognition of an object (for example, carton), other than a pallet, placed on the floor as a specific type of a pallet can be prevented, thereby preventing an interference accident of a pallet or the object with the fork 2. Calculation for comparison of shape data of a pallet is shortened, and an operation speed is enhanced, so that an expensive calculator having high processing capability need not be used.

In a state where the deviation of the target pallet is detected with high accuracy, the unmanned forklift 1 can perform, for example, an operation of picking up a pallet and a load on a floor and transporting the pallet and the load to another place, and an operation of picking up a second-tier pallet and load on a load on a first-tier pallet and transporting the picked-up pallet and load to another place, as an operation including an operation of inserting the fork 2 into the insertion opening of the target pallet by using the deviation detected by the pallet deviation detection section 14. Furthermore, the unmanned forklift 1 can perform, for example, a stacking operation of stacking a pallet and a load held by the fork 2 inserted into the insertion opening, onto a load on the target pallet, according to the deviation of the target pallet.

The above-described embodiments are in all aspects illustrative and not restrictive. Various modifications and variations can be devised without departing from the scope of the invention.

What is claimed is:

1. An unmanned forklift that has a pair of forks and automatically performs load handling with use of a pallet, the unmanned forklift comprising:
   a processor configured to:
      obtain a taken image from a camera for taking an image of a portion in front of the unmanned forklift, have, for a plurality of configurations of pallets, a learning model obtained by machine learning for a combination of an image of each of the pallets and a corresponding one of the configurations of the pallets, identify a configuration of a target pallet by inputting, to the learning model, the taken image of the target pallet, which is obtained by the processor, obtain position and shape data of the target pallet from a light detection and ranging (LIDAR) or time of flight (TOF) camera for measuring a distance to the target pallet, previously store, for the plurality of configurations of the pallets, position and shape data of each of the pallets, perform comparison between the position and shape data that is stored and corresponds to the configuration of the target pallet and the position and shape data of the target pallet, detect deviation of a position and an orientation of the target pallet based on the comparison, and interface with a controller for moving the unmanned forklift for performing at least one of (A) an operation including an operation of inserting the pair of forks respectively into insertion openings of the target pallet with reference to the deviation detected, and (B) a stacking operation of stacking the pallet and a load held by the pair of forks inserted into the insertion openings, onto a load on the target pallet according to the detected deviation of the target pallet.

2. The unmanned forklift according to claim 1, wherein the position and shape data is data representing a height of the target pallet, the height including the insertion openings of the pallet, and the processor performs comparison between a line segment based on the position and shape data that is stored and corresponds to the configuration of the target pallet, and another line segment based on the position and shape data of the target pallet, which is obtained by the processor, under a condition that both the line segments overlap each other.

3. The unmanned forklift according to claim 2, wherein the processor performs error determination, when the deviation detected by the processor is greater than a predetermined threshold value.

4. The unmanned forklift according to claim 2, wherein the processor performs comparison between shape data of the target pallet, which is obtained by the processor, and previously stored shape data of a same configuration of pallet as the target pallet, and determines that the shape data of the target pallet, which is obtained, is erroneous when a difference in the comparison is greater than a predetermined threshold value.

5. The unmanned forklift according to claim 2, wherein the camera takes the image of the target pallet;

the processor identifies the configuration of the target pallet at a first stop position;

the light detection and ranging (LIDAR) or time of flight (TOF) camera measures a distance to the target pallet at a second stop position that is closer to the target pallet than the first stop position is; and the processor obtains the position and shape data of the target pallet.

6. The unmanned forklift according to claim 1, wherein the processor performs error determination, when the deviation detected by the processor is greater than a predetermined threshold value.

7. The unmanned forklift according to claim 1, wherein the processor performs comparison between shape data of the target pallet, which is obtained by the processor, and previously stored shape data of a same configuration of pallet as the target pallet, and determines that the shape data of the target pallet, which is obtained, is erroneous when a difference in the comparison is greater than a predetermined threshold value.

8. The unmanned forklift according to claim 1, wherein the processor calculates a total number of the pallets in a specific range preset to have the target pallet therein, through image processing of the taken image of the target pallet, which is obtained by the processor, to thereby determine whether stacking is completed.

9. The unmanned forklift according to claim 8, wherein the processor having previously learned, through the machine learning, the image of the pallet as teaching data, for the pallets in a plurality of upper and lower tiers.

10. The unmanned forklift according to claim 1, further comprising cylinders of a fork width change device that changes an interval between the pair of forks so that the interval corresponds to a width between the insertion openings of the target pallet depending on the configuration of the target pallet, which is obtained by the processor.

11. The unmanned forklift according to claim 1, further comprising:

a distance sensor that is disposed at a leading end of each of the pair of forks, and detects presence or absence of an object in front thereof; and a load detecting sensor that detects whether the pallet is held by the pair of forks, wherein a detection result from the distance sensor about the presence or absence of the object, and a detection result from the load detecting sensor about whether the pallet is held, are used to perform at least one of:

a stacking operation of stacking a second-tier pallet and a load onto a load on a first-tier pallet; and an unstacking operation of picking up the second-tier pallet and the load on the load on the first-tier pallet and transporting the second-tier pallet and the load which are picked up to another place.

12. The unmanned forklift according to claim 1, wherein the camera takes the image of the target pallet;

the processor identifies the configuration of the target pallet at a first stop position;

the light detection and ranging (LIDAR) or time of flight (TOF) camera measures a distance to the target pallet at a second stop position that is closer to the target pallet than the first stop position is; and the processor obtains the position and shape data of the target pallet.

* * * * *